(12) United States Patent
Yoon et al.

(10) Patent No.: US 12,418,426 B2
(45) Date of Patent: Sep. 16, 2025

(54) ELECTRONIC DEVICE HAVING PARTIAL LEDGER IN BLOCKCHAIN NETWORK AND OPERATING METHOD THEREOF

(71) Applicant: SAMSUNG ELECTRONICS CO., LTD., Suwon-si (KR)

(72) Inventors: Woongah Yoon, Suwon-si (KR); Wooup Kwon, Suwon-si (KR); Hun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 18/139,551

(22) Filed: Apr. 26, 2023

(65) Prior Publication Data

US 2023/0261887 A1    Aug. 17, 2023

Related U.S. Application Data

(63) Continuation of application No. PCT/KR2022/015327, filed on Oct. 12, 2022.

(30) Foreign Application Priority Data

Oct. 12, 2021 (KR) ........................ 10-2021-0135099
Dec. 1, 2021 (KR) ........................ 10-2021-0169754

(51) Int. Cl.
*H04L 9/00* (2022.01)
*H04L 9/08* (2006.01)

(52) U.S. Cl.
CPC .............. *H04L 9/50* (2022.05); *H04L 9/0819* (2013.01); *H04L 9/0861* (2013.01)

(58) Field of Classification Search
None
See application file for complete search history.

(56) References Cited

U.S. PATENT DOCUMENTS 10,540,652 B2    1/2020    Saur et al.
10,834,095 B2    11/2020    Irazabal et al.
(Continued)

FOREIGN PATENT DOCUMENTS

JP    6909452 B2    7/2021
KR    10-1870113 B1    6/2018
KR    10-2484453 B1    1/2023

OTHER PUBLICATIONS

International Search Report (PCT/ISA/210) issued by the International Searching Authority on Jan. 30, 2023 in corresponding International Application No. PCT/KR2022/015327.
(Continued)

*Primary Examiner* — Ario Etienne
*Assistant Examiner* — Mohammad Yousuf A. Mian
(74) *Attorney, Agent, or Firm* — Sughrue Mion, PLLC

(57) ABSTRACT

An electronic device constituting a first blockchain node included in a blockchain network may generate an encryption key corresponding to a transaction based on obtaining a transaction generation request, transmit information of the encryption key to at least one blockchain node related to the transaction, encrypt first data stored in the partial ledger among input data required to execute a first smart contract of the transaction based on the encryption key, upload the first data to a data server included in the blockchain network, download second data encrypted based on the encryption key from the data server, the second data being data not stored in the partial ledger among the input data, decrypt the second data based on the encryption key, and execute the first smart contract based on the first data and the decrypted second data.

20 Claims, 9 Drawing Sheets

(56) References Cited

U.S. PATENT DOCUMENTS

| | | | |
|---|---|---|---|
| 11,023,968 B2 | 6/2021 | Arnold et al. | |
| 12,170,694 B2* | 12/2024 | Hu | H04L 63/10 |
| 2019/0379754 A1 | 12/2019 | Krishnaswamy | |
| 2020/0065763 A1 | 2/2020 | Rosinzonsky et al. | |
| 2020/0084037 A1* | 3/2020 | Zhang | H04L 9/3226 |
| 2020/0143337 A1 | 5/2020 | Conroy et al. | |
| 2020/0177390 A1 | 6/2020 | Yang et al. | |
| 2020/0267002 A1 | 8/2020 | Yuan et al. | |
| 2020/0410461 A1 | 12/2020 | Moir et al. | |
| 2021/0091924 A1 | 3/2021 | Holmberg et al. | |
| 2021/0224805 A1 | 7/2021 | Pennington et al. | |
| 2021/0288788 A1 | 9/2021 | Sardesai et al. | |
| 2021/0295303 A1 | 9/2021 | Phan et al. | |
| 2023/0252461 A1* | 8/2023 | Oh | H04L 65/40 |
| | | | 705/75 |

OTHER PUBLICATIONS

Written Opinion (PCT/ISA/237) issued by the International Searching Authority on Jan. 30, 2023 in corresponding International Application No. PCT/KR2022/015327.

* cited by examiner

ELECTRONIC DEVICE HAVING PARTIAL LEDGER IN BLOCKCHAIN NETWORK AND OPERATING METHOD THEREOF

CROSS-REFERENCE TO RELATED APPLICATION(S)

This application is a bypass continuation of PCT International Application No. PCT/KR2022/015327, which was filed on Oct. 12, 2022, and claims priority to Korean Patent Application No. 10-2021-0135099, filed on Oct. 12, 2021, and to Korean Patent Application No. 10-2021-0169754, filed on Dec. 1, 2021, in the Korean Intellectual Property Office, the disclosures of which are incorporated herein by reference in their entireties.

BACKGROUND

1. Field

The disclosure relates to an electronic device for controlling function execution using a blockchain network and an operating method thereof, and more specifically, to an electronic device for agreeing on a transaction between blockchain nodes in the blockchain network that have a partial ledger, and an operating method thereof.

2. Description of Related Art

A blockchain network is expressed as a decentralized network, and is distinguished from a centralized network in which decision-making is performed by a central server. The blockchain network may refer to a network in which decision-making is performed according to a consensus algorithm for nodes participating in the blockchain network.

A distributed ledger in the blockchain network may include at least one or more blocks generated based on a transaction executed in the blockchain network and a database (e.g., a state database) that stores data (e.g., state data) related to the transaction. A distributed ledger can be stored in each of nodes participating in the blockchain network. The distributed ledger may include one or more blocks linked to each other. The linking of these blocks may be expressed as a blockchain. At least one block stored in the distributed ledger may be expressed as a blockchain.

To maintain security and integrity, the distributed ledger of the blockchain network may be updated based on a consensus algorithm employed by the blockchain nodes participating in the blockchain network. Specifically, the blockchain nodes participating in the blockchain network may perform an endorsement operation, an ordering operation, and a validation operation, to generate a block based on the transaction.

A blockchain network may include blockchain nodes that validate transactions in the blockchain system. For example, an electronic device that is used to participate in the blockchain network may be configured as a blockchain node of the blockchain network.

Nodes participating in the blockchain network must store and maintain data about a full blockchain in devices thereof for the integrity of a block. When the data about the full blockchain is not large, there is no problem. However, as the number of blocks increases, data about the full blockchain gradually increases. Therefore, there is a problem in that the nodes participating in the blockchain must store, maintain, and manage a large amount of data. In addition, when a node participating in the blockchain is a personal mobile device, the node may be unable to meet the required level of performance.

Additionally, the nodes participating in the blockchain network participate in consensus operations for transactions in the blockchain system, including transactions that may be unrelated to the node. Hence, the blockchain nodes, which need to maintain central processing unit (CPU) processing and blockchain network communication, continuously consume power. Further, random communications with other blockchain nodes included the blockchain network may cause a security problem.

SUMMARY

According to various embodiments an electronic device constituting a first blockchain node included in a blockchain network, includes a communication circuit configured to communicate with at least one other device in the blockchain network, a memory storing a partial ledger including a part of a full ledger of the blockchain network, and at least one processor configured to: generate an encryption key corresponding to a transaction based on obtaining a transaction generation request, transmit information of the encryption key to at least one blockchain node related to the transaction, encrypt first data stored in the partial ledger among input data required to execute a first smart contract of the transaction based on the encryption key, upload the encrypted first data to a data server included in the blockchain network, download encrypted second data that is encrypted based on the encryption key, from the data server, wherein the second data is not stored in the partial ledger among the input data, decrypt the encrypted second data based on the encryption key, and execute the first smart contract based on the first data and the second data.

According to various embodiments a method for operating an electronic device constituting a first blockchain node included in a blockchain network, includes: generating an encryption key corresponding to a transaction based on obtaining a transaction generation request; transmitting information of the encryption key to at least one blockchain node related to the transaction; encrypting first data based on the encryption key, wherein the first data is stored in a partial ledger including part of a full ledger of the blockchain network, among input data required to execute a first smart contract of the transaction; uploading the encrypted first data to a data server included in the blockchain network; downloading encrypted second data that is encrypted based on the encryption key, from the data server, wherein the second data is not stored in the partial ledger among the input data; decrypting the encrypted second data based on the encryption key; and executing the first smart contract based on the first data and the second data.

According to various embodiments an electronic device constituting a first blockchain node included in a blockchain network, includes a communication circuit configured to communicate with at least one other device in the blockchain network, a memory storing a partial ledger including a part of a full ledger of the blockchain network, and at least one processor configured to: generate an encryption key corresponding to a transaction based on obtaining a transaction generation request, transmit information of the encryption key to at least one blockchain node related to the transaction, encrypt, based on the encryption key, first data stored in the partial ledger among input data required to execute a smart contract of the transaction, upload the encrypted first data to a data server of the blockchain network, the data server including a shared ledger, transmit an endorsement request of the transaction to the at least one blockchain node, obtain at least one endorsement data, based on the endorsement request, wherein the at least one endorsement data includes data generated by executing a smart contract of the transaction stored in the at least one blockchain node, wherein the smart contract is executed based on at least part of the shared ledger, and endorse the transaction based on the output data generated by the at least one blockchain node and output data generated by executing a first smart contract of the transaction stored in the memory.

The systems and methods described herein provide a number of technical effects and benefits. Various embodiments in the disclosure provide for an electronic device that may efficiently use its memory by storing a partial ledger including at least a part of a distributed ledger when forming a blockchain network with external electronic devices.

According to various embodiments, the electronic device may store a partial ledger and maintain the same consensus authentication level as a general blockchain consensus authentication level through a data server included in the blockchain network having a full ledger.

According to various embodiments, the electronic device may reduce unnecessary power consumption by participating only in transaction processing related to the electronic device.

According to various embodiments, the electronic device may obtain necessary data for transaction execution using a data server included in the blockchain network and thus reduce an amount of random communications with other devices.

Effects obtainable from the disclosure are not limited to the above-mentioned effects, and other effects which have not been mentioned, will be clearly understood by those skilled in the art to which the present disclosure belongs from the description below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described with reference to the accompanying drawings. However, it should be understood that it is not intended to limit the present disclosure to a specific embodiment, and various modifications, equivalents, and/or alternatives of the embodiments of the present disclosure are embraced. In regard to descriptions of the drawings, the same or similar reference numbers may be used for the same or corresponding components.

Figure 1:
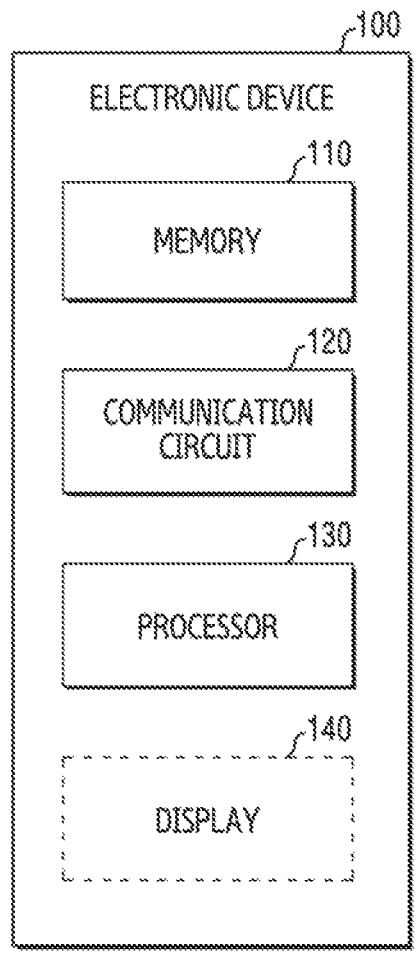
FIG. 1 is a block diagram of an electronic device, according to an embodiment.

FIG. 1 is a block diagram of an electronic device, according to an embodiment.

Referring to FIG. 1, an electronic device 100 may include a memory 110, a communication circuit 120, a processor 130 and a display 140 or a combination thereof. In various embodiments, the electronic device 100 may include an additional component in addition to the components shown in FIG. 1, or may omit at least one of the components shown in FIG. 1.

According to an embodiment, the memory 110 may store instructions, when executed, for the processor 130 to process data or control the component of the electronic device 100 to perform an operation of the electronic device 100. In addition, the memory 110 may include a secure area or a separate secure storage medium (e.g., a secure memory area (e.g., a trust zone) accessible only through a secure operating system (OS)). According to an embodiment, the memory 110 may include at least one blockchain application for performing a blockchain related operation. For example, it may include a blockchain platform corresponding to a blockchain application or a blockchain module for performing the blockchain related operation.

According to an embodiment, the memory 110 may store a distributed ledger of a blockchain network. If the electronic device 100 corresponds to a mobile node included in the blockchain network, the memory 110 may store a partial ledger including part of the distributed ledger of the blockchain network. The part of the distributed ledger distinguished from the full ledger may be referred to as the partial ledger.

According to an embodiment, the distributed ledger may include a blockchain connecting at least one block. At least one block may include at least one transaction of the blockchain network. Also, the distributed ledger may include a state data-base including state data related to transactions executed in the blockchain network.

According to an embodiment, the partial ledger stored in the memory 110 may include at least one block corresponding to at least one transaction in which the electronic device 100 participates. In addition, the state data-base stored in the memory 110 may include data of at least one transaction in which the electronic device 100 participates. Hence, the electronic device 100 may store in the memory 110 only the block related to the transaction in which the electronic device 100 participates, and thus efficiently manage the memory 110.

According to an embodiment, the communication circuit 120 may be configured to transmit and receive data by connecting to an external device. According to an embodiment, the electronic device 100 may build a blockchain network with at least one external device through the communication circuit 120. The blockchain network may include at least one external device and the electronic device 100 as blockchain nodes. Accordingly, the electronic device 100 and/or the at least one external device may serve as the blockchain node and a client. In an embodiment, the electronic device 100 may transmit and receive data to and from at least one external devices included in the blockchain network through the communication circuit 120, and perform transaction consensus of the blockchain network.

According to an embodiment, the blockchain network may include a data server accessible by the blockchain nodes. According to an embodiment, the data server may include a data base for storing a shared ledger generated based on at least some of the blockchain nodes.

According to various embodiments, the data server may indicate various devices for sharing data. For example, the data server may be a mobile device, a server, a tablet personal computer (PC), a computer, and/or a blockchain node included in the blockchain network. The data server is not limited to the above examples, and a device for communicating with the electronic device 100 may correspond to the data server.

According to various embodiments, the blockchain network may include a peer node and/or an ordering node as the blockchain node. According to an embodiment, the blockchain node is the electronic device 100 and/or the external electronic device, and may indicate a portable electronic device. For example, the electronic device 100 and/or the external electronic device may correspond to a mobile device, a tablet PC and/or a notebook. Descriptions on the blockchain network according to various embodiments shall be described by referring to FIG. 3.

According to an embodiment, the processor 130 may be electrically or operatively connected with the memory 110, the communication circuit 120 and the display 140. According to an embodiment, the processor 130 may execute an operation or data processing related to control and/or communication of at least one other component of the electronic device 100 using the instructions stored in the memory 110. According to an embodiment, the processor 130 may include at least one of a central processing unit (CPU), a graphic processing unit (GPU), a micro controller unit (MCU), a sensor hub, a supplementary processor, a communication processor, an application processor, an application specific integrated circuit (ASIC), and field programmable gate arrays (FPGA), and may have a plurality of cores.

According to an embodiment, the processor 130 may perform an operation related to the blockchain through the blockchain platform stored in the memory 110. According to an embodiment, the processor 130 may obtain a request for a transaction. For example, the processor 130 may obtain a transaction generation request, from a user of the electronic device 100 and/or other application stored in the memory 110.

According to an embodiment, the processor 130 may generate an encryption key corresponding to the transaction in response to obtaining the transaction generation request. According to an embodiment, the encryption key, which is based on the transaction, may indicate a unique encryption key for the transaction executed in the blockchain network. According to an embodiment, the processor 130 may generate the encryption key based on various encryption key generation algorithms. For example, the processor 130 may generate an encryption key corresponding to a symmetric encryption algorithm (e.g., advanced encryption standard (AES)) or an asymmetric encryption algorithm (e.g., Rivest Shamir Adleman (RSA)). According to an embodiment, the processor 130 may share the generated encryption key to other blockchain nodes included in the blockchain network.

According to an embodiment, the symmetric encryption algorithm may indicate an encryption scheme in which data encryption key and decryption key are the same. In an embodiment, if the processor 130 uses the symmetric encryption algorithm, the processor 130 may generate the encryption key for the transaction, and share the generated encryption key to other blockchain nodes included in the blockchain network. In another example, the processor 130 may share a seed value used to generate the encryption key to other blockchain nodes. The other blockchain nodes sharing the seed value (e.g., a root seed) may generate the same encryption key as the encryption key generated by the processor 130 using the seed value. The processor 130 may use the generated encryption key in encrypting data. Also, the other blockchain nodes sharing the encryption key and/or the seed value of the encryption key may decrypt data based on information of the obtained encryption key. According to various embodiments, the processor 130 may use various encryption schemes, for encrypting or decrypting data. For example, the processor 130 may use a stream cipher scheme (e.g., Rivest cipher 4 (RC4), A5) or a block cipher system (e.g., data encryption standard, AES).

According to an embodiment, the asymmetric encryption algorithm may indicate an encryption algorithm where data encryption key and decryption key are different. In the asymmetric encryption, the processor 130 may encrypt or decrypt data using both a public key and a private key. According to an embodiment, the processor 130 may generate the public key and the private key for the transaction based on the seed value. For example, the processor 130 may generate a master private key and a master chain code from a hash value generated through a hash-based message authentication code (HMAC)-secure hash algorithm (SHA) 512 function. In a 512-bit hashed value, left 256 bits may be used as the private key, and right 256 bits may be used as the chain code. The processor 130 may acquire the public key using the private key and an elliptic curve function.

According to an embodiment, the processor 130 may generate a public key and a private key which are the encryption key for the transaction, and share the generated public key and private key to other blockchain nodes included in the blockchain network. In another example, the processor 130 may share a seed value used to generate the encryption key to other blockchain nodes. The other blockchain nodes sharing the seed value may generate the public key and the private key which are the same encryption key as the encryption key generated by the processor 130 using the seed value. Next, the processor 130 may use the generated public key and/or encryption key in encrypting data. Also, the other blockchain nodes sharing the encryption key and/or the seed value of the encryption key may decrypt data based on information of the obtained encryption key. In an embodiment, if sharing the private key, the processor 130 may transmit a data packet including the generated private key in a secure field not accessible by an external device to the other blockchain nodes. According to various embodiments, for the data encryption or decryption, the processor 130 may use one of various encryption schemes including elliptic curve cryptosystem (ECC), RSA, and elgammal. The encryption key disclosed in this document may indicate a symmetric key or an asymmetric key (a public key and a private key) according to the encryption algorithm used by the processor 130.

According to an embodiment, the seed value may indicate a default value for generating a plurality of keys. The seed value may indicate a value randomly generated in an available condition range in the blockchain network. For example, the seed value may be generated based on a dynamic characteristic (e.g., a unique value of a hardware chip) occurring in the operation of the electronic device 100.

According to an embodiment, the processor 130 may determine input data required to execute a first smart contract for the requested transaction. According to an embodiment, the input data may indicate data (e.g., read-set) to refer to in the state data-base stored in the memory 110, according to executing the smart contract. Hereafter, the input data may indicate the same meaning. In addition, the processor 130 may determine whether data required to execute the first smart contract is stored in the memory 110. For example, the processor 130 may determine whether the input data (e.g., read-set) required to execute the first smart contract is included in the memory 110. For example, the processor 130 may determine whether data to read from the state data-base to execute the first smart contract is stored in the memory 110.

According to an embodiment, the processor 130 may encrypt first data stored in the memory 110 among the input data based on the encryption key. According to an embodiment, the first data may be data stored in the memory 110 among the input data required to execute the smart contract for the transaction. According to an embodiment, the processor 130 may encrypt the first data stored in the partial ledger included in the memory 110 among the input data required to execute the smart contract for the transaction, using the encryption key based on the transaction. According to various embodiments, the processor 130 may encrypt the first data using the encryption key based on various encryption algorithms.

According to an embodiment, the processor 130 may encrypt the first data based on the symmetric encryption algorithm. For example, the processor 130 may encrypt the first data through the encryption key based on the AES algorithm. The processor 130 may encrypt the first data by modifying a state array of a 4×4 byte array type through multiple rounds according to a size of the generated encryption key. The processor 130 may encrypt the first data by repeating a set operation of four operations addroundkey, subbytes, shiftrows, and mixcolumns. The above-described example may be applied if the processor 130 encrypts data in the symmetric encryption manner according to the AES algorithm. The processor 130 is not limited to the described example and may encrypt the first data based on the symmetric encryption scheme based on the encryption key generated based on various algorithms.

According to an embodiment, the processor 130 may encrypt the first data based on the asymmetric encryption algorithm. For example, the processor 130 may encrypt the first data using the public key of the generated encryption key.

According to an embodiment, the processor 130 may encrypt the first data based on the asymmetric encryption algorithm. For example, the processor 130 may encrypt the first data through the public key based on the RSA algorithm. In an embodiment, the processor 130 may encrypt the first data using the public key and the encryption function. It is not limited to the described example, and the processor 130 may encrypt the first data based on the asymmetric encryption scheme using the encryption key generated based on various algorithms.

The data encryption scheme disclosed in this document may be similar to the encryption scheme of the first data. According to an embodiment, the processor 130 may upload the encrypted first data to the data server included in the blockchain network. For example, the processor 130 may transmit the first data to the blockchain network which includes the electronic device 100 as the blockchain node through the communication circuit 120. For example, the processor 130 may upload the first data encrypted with the encryption key to the data server included in the blockchain network. According to an embodiment, the processor 130 may upload the first data encrypted using the encryption key to the shared ledger of the transaction included in the data server.

According to an embodiment, the other blockchain nodes included in the blockchain network may download the uploaded first data. In an embodiment, the other blockchain nodes may decrypt the encrypted first data based on encryption key information shared through the electronic device 100.

For example, if the processor 130 encrypts the first data based on the symmetric encryption algorithm, the other blockchain nodes may decrypt the first data using a symmetric key which is the shared encryption key. Alternatively, the other blockchain nodes may generate a symmetric key using the shared seed value, and decrypt the first data using the generated symmetric key. The generated symmetric key may indicate the same key as the symmetric key owned by the electronic device 100.

As another example, if the processor 130 encrypts the first data based on the asymmetric encryption algorithm, that is, if the processor 130 encrypts the first data with the public key, the other blockchain nodes may decrypt the first data using the shared private key. For example, the other blockchain nodes may acquire the first data by applying the first data encrypted using the private key shared from the electronic device 100 to the encryption function. As another example, if the processor 130 shares the seed value for generating the private key, the other blockchain nodes may generate the private key using the seed value. The generated private key may indicate the same key as the private key owned by the electronic device 100. The other blockchain nodes may generate the private key using the seed value, and decrypt the first data using the generated private key.

According to an embodiment, the processor 130 may download second data encrypted based on the encryption key from the data server. According to an embodiment, the second data may be data not stored in the memory 110 among the input data required to execute the smart contract for the transaction. According to an embodiment, the processor 130 may obtain the second data not stored in the memory 110 among the input data required to execute the smart contract for the transaction through the data server. According to an embodiment, the second data obtained from the data server may indicate data encrypted through an external device sharing the encryption key from the electronic device 100.

According to an embodiment, the processor 130 may decrypt the second data based on the encryption key, and execute a first smart contract for the requested transaction based on the first data and the second data. For example, the processor 130 may execute the first smart contract using the first data stored in the partial ledger and the decrypted second data as the input data.

According to an embodiment, if every input data required to execute the first smart contract is stored in the state data-base, the processor 130 may execute the first smart contract based on the stored data.

According to another example, if some of the data required to execute the first smart contract is not stored in the state data-base, the processor 130 may obtain the not-stored data from the data server included in the blockchain network. According to an embodiment, the data server may store data uploaded by the blockchain nodes included in the blockchain network. For example, the data server may include the shared ledger corresponding to the transaction running in the blockchain network, and store state data of the transaction in the shared ledger. According to an embodiment, the data uploaded to the shared ledger may be data encrypted based on the encryption key. According to an embodiment, the processor 130 may execute the first smart contract using the obtained data.

According to various embodiments, the electronic device 100 may share various data with the other blockchain nodes included in the blockchain network. For example, the electronic device 100 may share various data to share with the other blockchain nodes using the data server. For example, the processor 130 may share data (e.g., smart contract version information) related to the smart contract and/or data (e.g., blockchain node configuration information) related to the blockchain node included in the blockchain network with the other blockchain nodes via the data server. According to an embodiment, the processor 130 may encrypt various data to share with the other blockchain nodes through the encryption key, and share the encrypted data with the other blockchain nodes via the data server. For example, the processor 130 may encrypt various data to share with the other blockchain nodes using the encryption key, and upload the encrypted data to the data server. The other blockchain nodes included in the blockchain network may download the data uploaded to the data server. Also, the processor 130 may download the various data uploaded to the data server. The various data uploaded to the data server may be data encrypted using the encryption key. Hence, the processor 130 may download the encrypted data, and decrypt using the encryption key.

According to an embodiment, the processor 130 may endorse the transaction using at least part of data returned according to executing the first smart contract.

According to an embodiment, as the endorsement of the transaction is finished in the blockchain network, an operation for generating a block including transaction data of the transaction may be performed. For example, the processor 130 may perform the operation for generating a block including a hash field and block data. The hash field may include previous block information of the distributed ledger. The block data may include data related to the transaction. For example, the processor 130 may request the ordering node (e.g., a block generation node) included in the blockchain network to generate the block including the transaction data. The block may be finalized through consensus with the blockchain nodes included in the blockchain network through the communication circuit 120. In an embodiment, the processor 130 may store the block in the memory 110. For example, the processor 130 may obtain an update request of the block finalized through the consensus from the ordering node, and store the block in the memory 110 based on the update request. In so doing, the processor 130 may store the block as a block after a terminal block of the blockchain of the partial ledger.

According to an embodiment, the display 140 may display various contents (e.g., text, image, video, icon, and/or symbol). According to an embodiment, the display 140 may include a liquid crystal display (LCD), a light emitting diode (LED) display or an organic light emitting diode (OLED) display.

According to an embodiment, the processor 130 may display various contents related to the blockchain application on the display 140. For example, the processor 130 may display contents indicating success or failure notification of the transaction requested to execute through the display 140. For example, if the endorsement operation, the validation operation and/or the ordering operation for the transaction consensus fails, the processor 130 may abort the transaction consensus operation and display the notification of the block generation failure on the display 140. According to various embodiments, the processor 130 is not limited to the display 140 and may output the failure notification using various configurations included in the electronic device 100.

Figure 2:
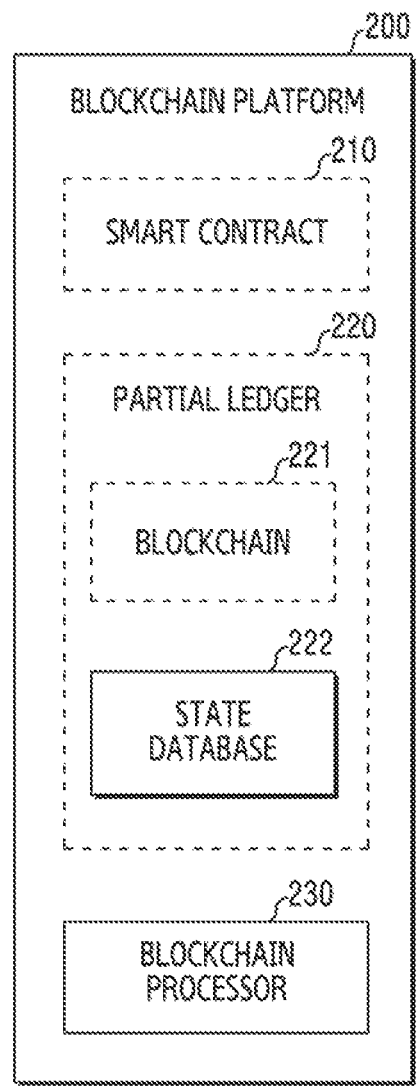
FIG. 2 is a block diagram illustrating a blockchain platform of an electronic device, according to an embodiment.

FIG. 2 is a block diagram illustrating a blockchain platform of an electronic device, according to an embodiment.

Referring to FIG. 2, an electronic device 100 may include the blockchain platform 200. According to an embodiment, the blockchain platform 200 may correspond to the blockchain application for performing the blockchain related operation stored in the memory 110 or the blockchain module for performing the blockchain related operation stored in the processor 130.

According to an embodiment, the blockchain platform 200 may include a smart contract 210, a partial ledger 220 and/or a blockchain processor 230. According to various embodiments, the blockchain platform 200 may further include various configurations to perform an operation related to the blockchain or may omit some configuration.

According to an embodiment, the blockchain processor 230 may be included in the processor 130. The blockchain processor 230 may control operations of components included in the blockchain platform 200. For example, the blockchain processor 230 may execute a transaction including ledger synchronization, transaction signing and/or transaction recording on the blockchain network.

According to an embodiment, the blockchain platform 200 may include the smart contract 210. The smart contract indicates script or software code used to process the transaction in the blockchain based system. More specifically, the smart contract is code which programs various conditions used to process the transaction, states, and actions according to the conditions, and may include, for example, smart contract of Ethereum, chain code of hyper ledge fabric and so on. In the blockchain based system, the blockchain node may share the uploaded smart contract.

In executing the smart contract 210 for the transaction, the blockchain processor 230 may provide a necessary value (e.g., read-set) to the smart contract 210. For example, the blockchain processor 230 may provide the input data explained by referring to FIG. 1 to the smart contract 210. Also, the blockchain processor 230 may store an outputted value, by executing the smart contract 210. For example, the blockchain processor 230 may provide data and factors required to execute the smart contract 210.

According to an embodiment, as the smart contract 210 is executed, a data (required data) set (e.g., read-set) to read from a state database 222 to execute the smart contract 210, data (e.g., write-set) changed in data stored in the state database according to the execution of the smart contract 210 and/or data (e.g., delete-set) deleted from the state database according to the execution of the smart contract 210 may be returned. Hereafter, the data returned according to executing the smart contract 210 may be referred to as output data.

In an embodiment, the blockchain platform 200 may store a part of the distributed ledge of the blockchain network where the electronic device 100 is configured as the blockchain node. The distributed ledger may include a blockchain 221 which is a linked-list of blocks including data of transactions executed in the blockchain network and the state database 222 which stores world state data.

In an embodiment, the partial ledge 220 may include the blockchain 221 and the state database 222. In an embodiment, the partial ledger may include the part of the distributed ledger of the blockchain network. According to an embodiment, the partial ledger 220 may store the transaction data related to the electronic device 100 in the blockchain network. For example, it may store blocks and data based on the transaction participated by the electronic device 100 in consensus. According to an embodiment, the partial ledger 220 may be a partial ledger including at least a part of a full ledger of the blockchain network. For example, the partial ledger may be the partial ledger which stores blocks and data of transactions related to the electronic device 100 in the full ledger which stores blocks and data of every transaction of the blockchain network.

According to an embodiment, the blockchain 221 may include at least one block generated through the blockchain network. The block may include a block header and transaction data. According to an embodiment, the block header may include at least one of a hash value of a header and a data region, a hash value of a previous block, a height value of a block, a hash value of state data after executing the transaction included in the block, a public key of a block generator, a value obtained by signing a hash value based on a private key of the block generator, or a value obtained by signing a hash value based on an attestation key certificate chain or an attestation key.

The block data may include at least one of hash values of at least part of transaction data, smart contract version information, smart contract ID, smart contract function ID, smart contract data which is a factor value (e.g., read-set) required for the smart contract function, a nonce value which is a transaction generation number of the transaction generator, a public key of the transaction generator, a value obtained by signing the hash value based on the private key of the transaction generator, a value obtained by signing the attestation key certificate chain or the hash value based on the attestation key. In addition, the block data may include at least one of transaction type, transaction version, timestamp, blockchain network channel ID value, epoch, payload visibility, chain code path, chain code name, chain code version, chain code type, timeout, transaction endorser ID and endorser signature, response status, namespace, read-set, write-set, read list, and Merkle tree query summary.

In an embodiment, the block data may include block metadata. The block metadata may include at least one of block generator ID value, related signature, last configuration block number, and flag of each transaction included in the block.

In an embodiment, the transaction may include the smart contract (or chain code). At a transaction request, the smart contract may be executed, and thus the world state may be updated.

In an embodiment, the blocks of the partial ledger 220 are chained (e.g., linked-list) and the block data may be stored in the partial ledger 220. For example, at least one block included in the blockchain 221 may include a hash field and block data. According to an embodiment, the hash field may include previous block information of the full ledger of the blockchain network and previous block information of the partial ledger of the blockchain network. In an embodiment, the block data may include transaction data of the corresponding block.

According to an embodiment, at least one block included in the blockchain 221 may be connected based on the previous block information included in the hash field.

In an embodiment, the state database 222 may store values changed by the transaction execution of the blockchain network in a key-value form. According to an embodiment, the key-value form may include data key, data value, data hash, information of a block node owning data in the blockchain network and block number. In an embodiment, the data stored in the state database 222 may be expressed as state data. The state data may indicate, for example, data stored in the world state which is a database used in the Hyperledger fabric. However, it is not limited thereto and the state database 222 may use a level database or a couch database.

The state database 222 may store final values changed by executing transactions in the key-value form. Hence, the electronic device 100 may identify the state database 222 to identify the final values by the transaction execution of the blockchain network.

According to an embodiment, the state database 222 may store data of transactions participated by the user of the electronic device 100. For example, it may store values changed by the transaction execution related to the electronic device 100 in the blockchain network.

According to an embodiment, the blockchain processor 230 may control the electronic device 100 to process the blockchain consensus in the blockchain network. For example, the blockchain processor 230 may process the blockchain consensus based on the consensus algorithm used in the blockchain network. The blockchain processor 230 may support various consensus algorithms which are typically used in the blockchain. For example, the blockchain processor 230 may perform the transaction consensus with the blockchain nodes included in the blockchain network based on proof of work (POW), proof of stake (POS), practical Byzantine fault-tolerance (PBFT), and reversible addition—fragmentation chain-transfer (RAFT).

According to an embodiment, the blockchain processor 230 may endorse the transaction requested to generate. For example, the blockchain processor 230 may generate first output data by executing the smart contract for the transaction. According to an embodiment, the first output data may indicate a data set returned according to executing the smart contract. For example, the first output data may include data (e.g., write-set) changed in the state database 222 according to the smart contract execution, data (e.g., the input data described in FIG. 1) referred to in the state database 222 according to the smart contract execution, and data (e.g., delete-set) deleted from the state database 222 according to the smart contract execution.

According to an embodiment, the blockchain processor 230 may transmit an endorsement request including the transaction to a blockchain node related to the transaction among at least one blockchain node (e.g., a peer node) included in the blockchain network.

According to an embodiment, the blockchain processor 230 may obtain endorsement data including second output data of the transaction from the blockchain node related to the transaction based on the endorsement request. For example, the blockchain processor 230 may obtain the second output data including a smart contract execution result of the transaction from a second blockchain node related to the transaction.

According to an embodiment, the blockchain processor 230 may endorse the transaction based on the first output data and the second output data obtained from the second blockchain node. For example, if the first output data which is the execution result of the first smart contract included in the electronic device 100 and the second output data which is the execution result of the second smart contract included in the second blockchain node are the same, the blockchain processor 230 may determine that the endorsement of the transaction is successful. As another example, if the first output data and the second output data are different, the blockchain processor 120 may determine that the transaction endorsement fails. According to various embodiments, the blockchain processor 230 may endorse the transaction using one of various endorsement methods. For example, the blockchain processor 230 may determine the endorsement success even if the first output data and the second output data are identical in part. For example, the blockchain processor 230 may perform the endorsement based on the data changed in the state database 222 according to executing the smart contract 210 in data included in the first output data and the second output data. As another example, the blockchain processor 230 may perform the endorsement based on data changed in the state database and data deleted from the state database according to executing the smart contract 210 in data included in the first output data and the second output data.

According to an embodiment, the blockchain processor 230 may perform an operation related to the blockchain network which the electronic device 100 participates in as the blockchain node. According to an embodiment, the blockchain processor 230 may build the blockchain network, and perform an operation related to other nodes (external devices) included in the blockchain network.

Figure 3:
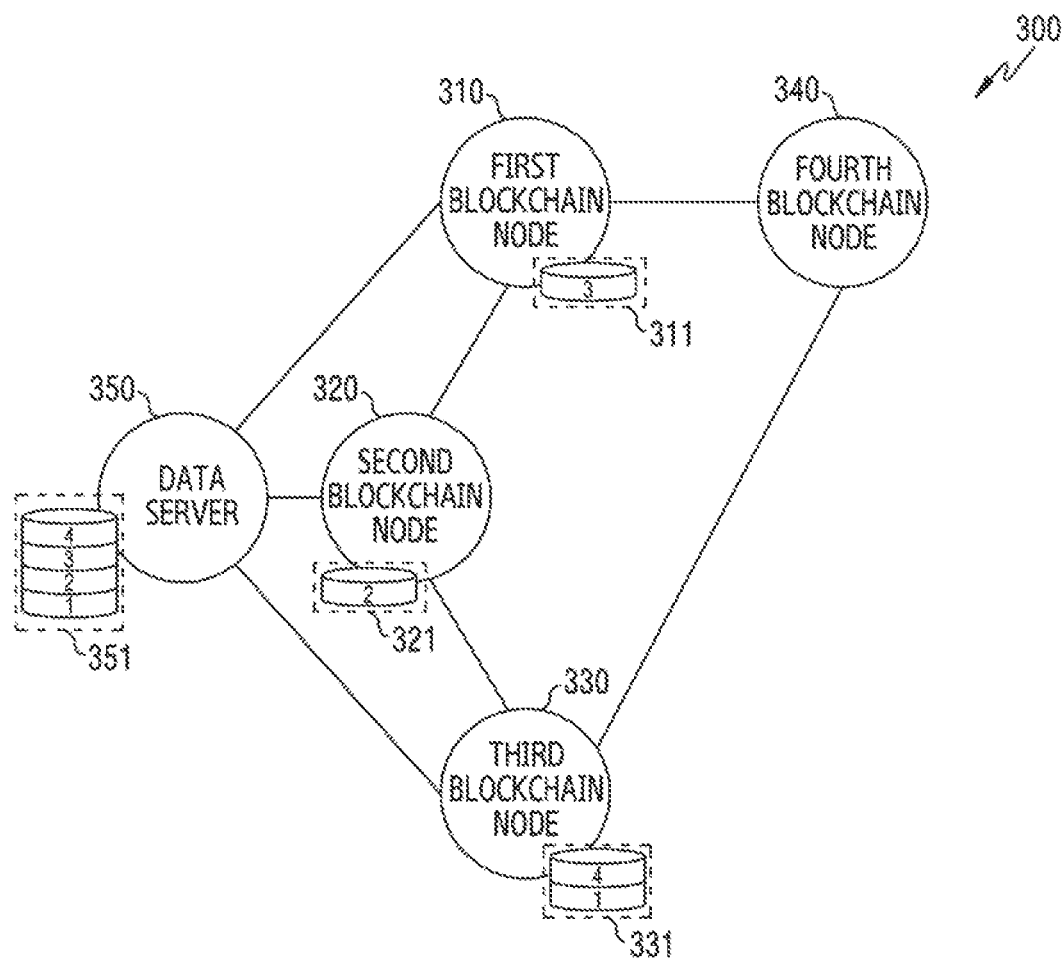
FIG. 3 is a block diagram illustrating a blockchain network, according to an embodiment.

FIG. 3 is a block diagram illustrating a blockchain network, according to an embodiment.

Referring to FIG. 3, a plurality of blockchain nodes 310, 320, 330, and 340 and a data server 350 may build a blockchain network 300. The plurality of the blockchain nodes 310, 320, 330, and 340 building the blockchain network 300 may include a portable electronic device. For example, the plurality of the blockchain nodes 310, 320, 330, and 340 may correspond to a mobile, a tablet PC and/or a notebook. According to an embodiment, a first blockchain node 310, a second blockchain node 320 and a second blockchain node 330 may indicate endorser nodes which are portable mobile nodes. According to an embodiment, a fourth blockchain node 340 may indicate an ordering node.

According to an embodiment, the first through third blockchain nodes 310, 320 and 330 may simulate transaction execution and generate read-write sets. The read-set may simulate a task to read data of the partial ledger in the transaction. The write-set may indicate a data set to be updated to the ledger if the transaction is executed and committed to the partial ledger. However, it is not limited thereto, and the first through third blockchain nodes 310, 320 and 330 may generate various data sets. For example, the first through third blockchain nodes 310, 320 and 330 may generate a delete-set which is a data set to be deleted from the ledger, if the transaction is executed and committed to the partial ledger.

According to an embodiment, the endorser node may execute and endorse the transaction. Also, the endorser node may be a committer node. For example, the first through third blockchain nodes 310, 320 and 330 may update the partial ledger stored in their nodes based on an update request of the endorsed transaction.

According to an embodiment, the first blockchain node 310 may be a leader node which requests to generate a transaction. According to various embodiments, the leader node may change in each transaction generated in the blockchain network 300.

According to an embodiment, the first blockchain node 310 (e.g., the electronic device 100), the second blockchain node 320 and/or the third blockchain node 330 may include a similar configuration to the electronic device 100 explained in FIG. 1 and FIG. 2. For example, the plurality of the blockchain nodes 310, 320, 330, and 340 may include similar configurations to the blockchain platform 200 as configurations for performing necessary operations in the blockchain network. For example, the first through third blockchain nodes 310, 320 and 330 may store a smart contract (e.g., the smart contract 210) and the partial ledger (e.g., the partial ledger 220) in a memory (e.g., the memory 110) of the electronic device (e.g., the electronic device 100). For example, the first blockchain node 310 may include a first partial ledger 311 including a third block and state data of the third block in the distributed ledger of the blockchain network.

According to an embodiment, the fourth blockchain node 340 may correspond to the ordering node. For example, the fourth blockchain node 340 may receive transaction data including the transaction and the read-write sets and the block generation request from the endorser node (e.g., at least one of the first through third blockchain nodes 310, 320 and 330). The fourth blockchain node 340 may sequence at least one transaction data obtained from the endorser node in the blockchain network and then generate blocks in order. Alternatively, the fourth blockchain node 340 may perform the consensus to sequence the transaction data and then generate blocks in order, and request the committer node to update the blocks. For example, the fourth blockchain node 340 may receive transaction data including the transaction and the read-write sets and the block generation request from the first blockchain node 310. In addition, the fourth blockchain node 340 may identify whether input data (e.g., read-set) and output data have no problems between transactions. For example, the fourth blockchain node 340 may identify whether the input data (e.g., read-set) and the output data conflict between the transactions. In an embodiment, the fourth blockchain node 340 may identify no conflicts, and finalize the block by performing the consensus.

According to the present disclosure, the four blockchain nodes build the blockchain network to ease the explanations, but it is not limited thereto.

According to an embodiment, the data server 350 may indicate a storage space inside the blockchain network accessible by the plurality of the blockchain nodes 310, 320, 330, and 340 included in the blockchain network 300. According to another example, the data server 350 may be an external storage space of the blockchain network 300.

According to an embodiment, the data server 350 may indicate a space allowing the first through third blockchain nodes 310, 320 and 330 to store and retrieve data to share necessary data for the transaction consensus. According to an embodiment, the data server 350 may generate the shared ledger by receiving a request from the leader node which obtains the transaction generation request. For example, the data server 350 may generate a shared ledger 351 of the transaction based on a request of the first blockchain node 310 obtaining the transaction generation request. The shared ledger 351 may be deleted as the transaction generation is finished.

According to an embodiment, the first through third blockchain nodes 310, 320 and 330 may encrypt the necessary data for the transaction consensus with a transaction encryption key and upload it to the shared ledger 351.

According to an embodiment, the first blockchain node 310 may generate the encryption key for the transaction. In addition, it may share the generated encryption key to nodes (e.g., the second blockchain node 320 and the third blockchain node 330) to participate in the transaction consensus among at least one blockchain node included in the blockchain network 300. The data server 350 may obtain the encrypted data from the first through third blockchain nodes 310, 320 and 330, and upload it to the shared ledger 351.

According to an embodiment, the first blockchain node 310 may use various methods to share the generated encryption key. For example, the processor 130 may share the encryption key generated in a plaintext form to the nodes (e.g., the second blockchain node 320 and the third blockchain node 330) to participate in the consensus.

As another example, in sharing the generated encryption key, the first blockchain node 310 may share through the asymmetric encryption scheme. For example, the processor 130 may encrypt the generated encryption key with a public key of the second blockchain node 320 and share to the second blockchain node 320. In addition, the processor 130 may encrypt the generated encryption key with a public key of the third blockchain node 330 and share to the third blockchain node 320. In an embodiment, the second blockchain node 320 and the third blockchain node 330 sharing the encryption key encrypted with their public key may decrypt and use the encryption key with their private key. Yet, the method for the first blockchain node 310 to share the encryption key is not limited thereto.

In an embodiment, the first through third blockchain nodes 310, 320 and 330 may perform transaction generation and block recording related to the devices in all the transactions in the blockchain network 300. For example, the first through third blockchain nodes 310, 320 and 330 may participate in the transaction consensus related to the devices, and store only a block and state data of the transaction related to the devices in their memory. For example, the first blockchain node 310 may participate in the transaction consensus related to the electronic device 100 and/or the user of the electronic device 100, and store only the block and the state data of the transaction in the memory 110. Hence, the first through third blockchain nodes 310, 320 and 330 may store a partial ledge storing only the block and the state data of their participating transaction of the full ledger of the blockchain network 300 in their memory. For example, the first blockchain node 310 may store the first partial ledger 311 including third block data. In addition, the second blockchain node 320 may store a second partial ledger 321 including second block data. In addition, the third blockchain node 330 may store a third partial ledger 331 including first and fourth block data.

According to an embodiment, the first through third blockchain nodes 310, 320 and 330 each may independently execute a smart contract for the transaction execution. In an embodiment, the smart contract may execute the same program logic for processing the transaction. The nodes included in the blockchain network 300 according to an embodiment may be configured to participate in only the transaction executed related to the devices.

In an embodiment, to execute the smart contract, the first through third blockchain nodes 310, 320 and 330 may refer to the state data stored in the state database included in at least one of the first through third blockchain nodes 310, 320 and 330. For example, the first through third blockchain nodes 310, 320 and 330 each may refer to the state data uploaded to the data server 350 through at least a part of the first through third blockchain nodes 310, 320 and 330 to execute the smart contract.

According to an embodiment, the first through third blockchain nodes 310, 320 and 330 each may execute the smart contract based on the state data, and determine whether to execute the transaction based on a result of the endorsement process performed between them. For example, the transaction endorsement success may be determined if result values (e.g., output data) generated by executing the smart contract by the first through third blockchain nodes 310, 320 and 330 match. The block of the transaction may be generated through the endorsement performed between the devices related to the transaction execution among the first through third blockchain nodes 310, 320 and 330. According to an embodiment, the generated block may be added to the blockchain of the distributed ledger stored in the devices related to the transaction execution. For example, the added block may be connected as a block after a terminal block of the blockchain of the distributed ledger.

According to an embodiment, key values stored in the state database of the devices related to the transaction execution among the first through third blockchain nodes 310, 320 and 330 may be updated by the transaction execution. For example, as finishing the transaction generation and execution, the first through third blockchain nodes 310, 320 and 330 may obtain a transaction update request from the fourth blockchain node 340. Based on the update request, the first through third blockchain nodes 310, 320 and 330 may update their partial ledgers (the first partial ledger 311, the second partial ledger 321 and the third partial ledger 330).

The nodes of the blockchain network 300 according to an embodiment, which participate only in the transaction execution related to their device, may store the state data of the transaction related to the devices. Accordingly, the nodes of the blockchain network 300 may update the state database if the transaction related to the devices is executed, without having to update the state database according to the execution of every transaction.

Figure 4:
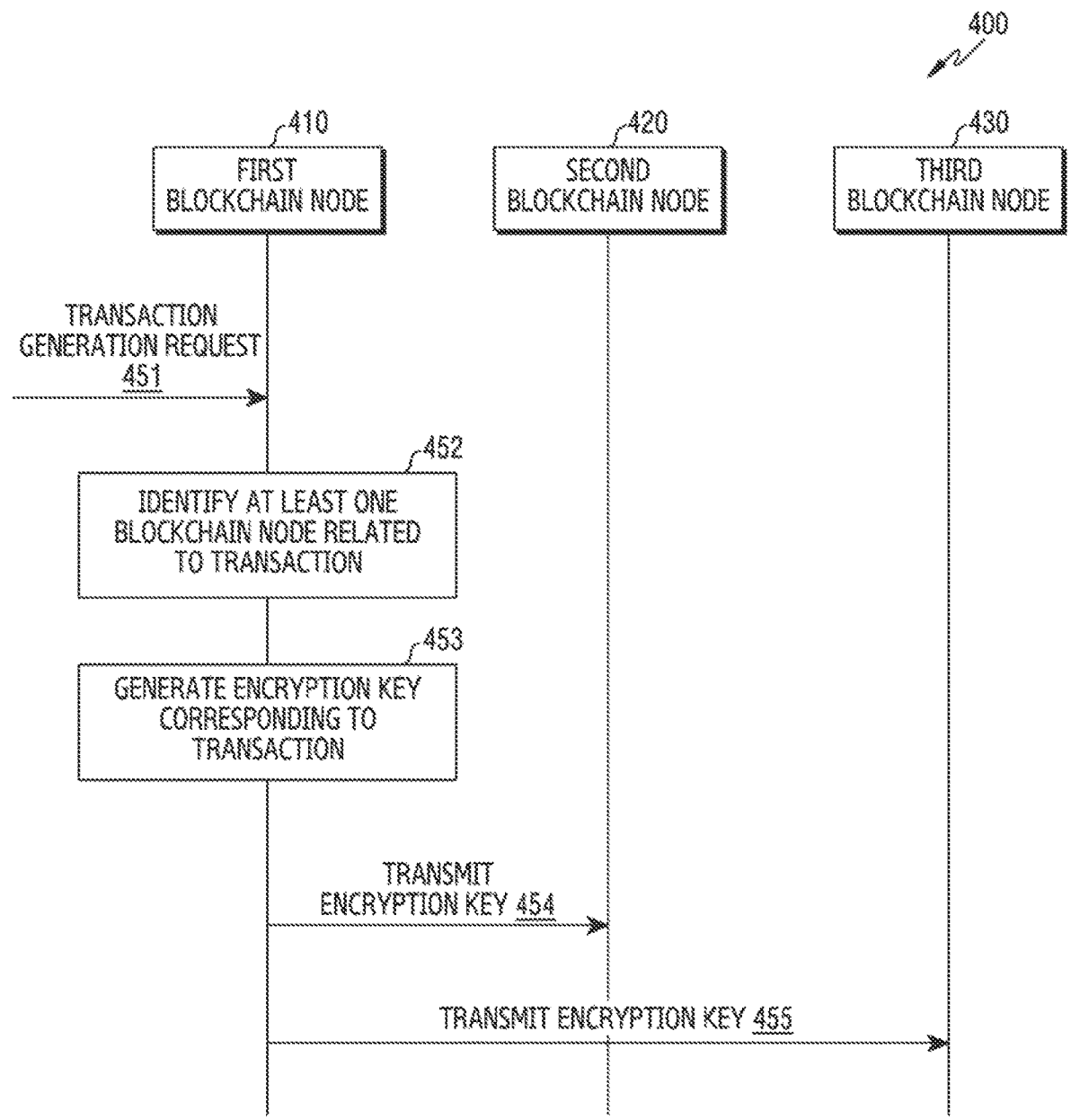
FIG. 4 is a flow diagram illustrating a method of generating an encryption key by an electronic device according to an embodiment.
Figure 5:
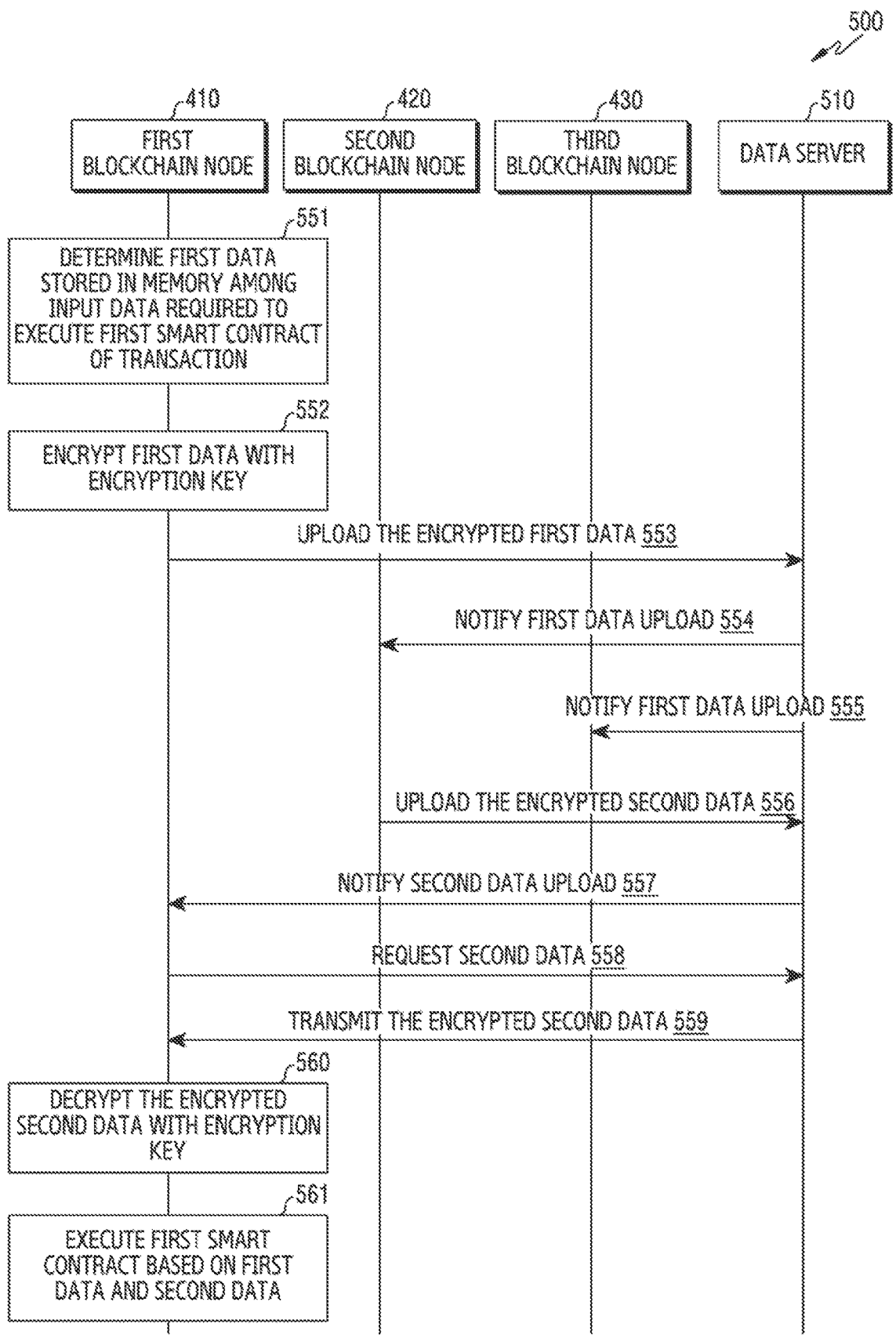
FIG. 5 is a flow diagram illustrating a method of executing a smart contract by an electronic device according to an embodiment.
Figure 6:
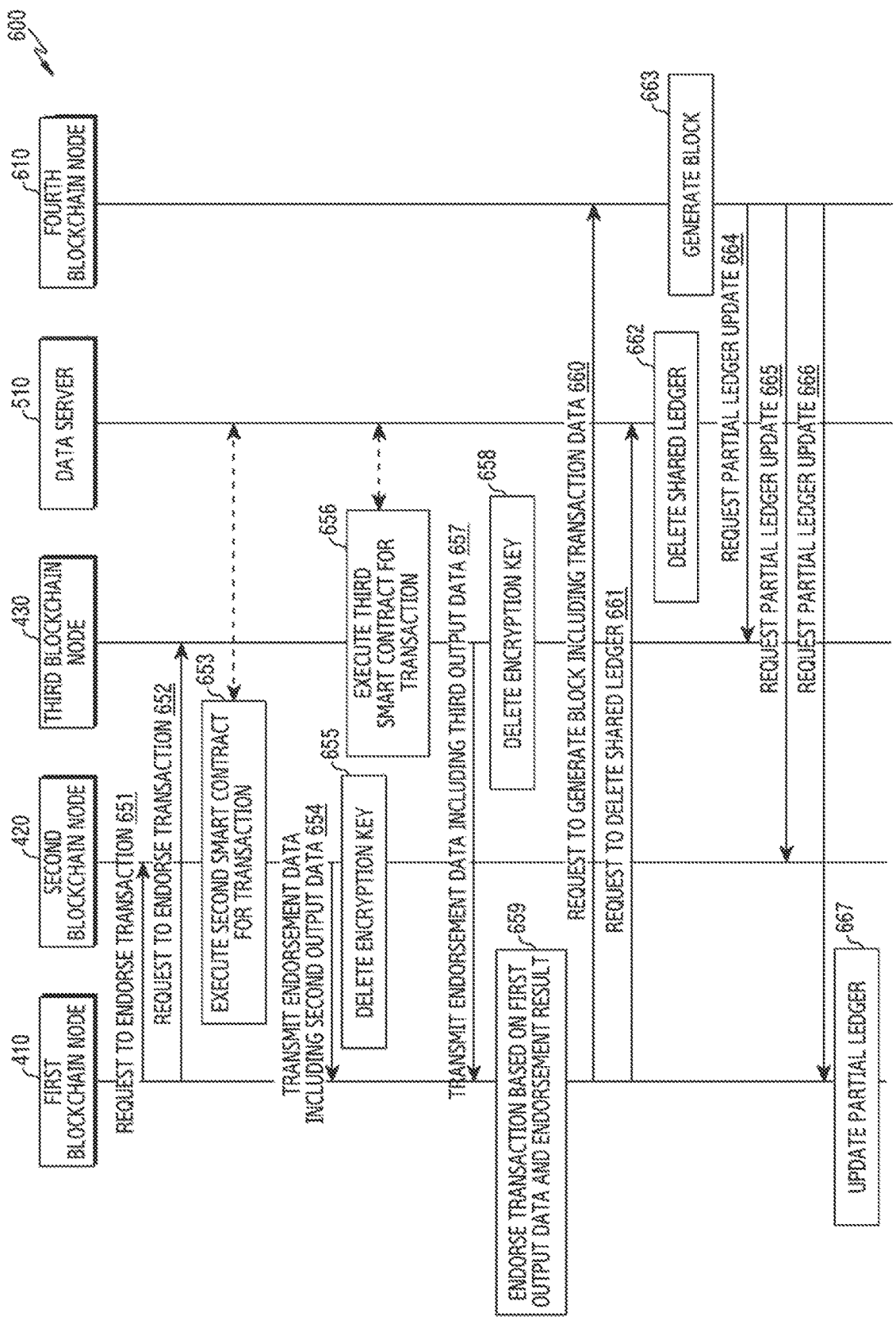
FIG. 6 is a flow diagram illustrating a method of endorsing a transaction of a blockchain network, according to an embodiment.

FIG. 4 through FIG. 6 are flow diagrams illustrating methods of transaction generation of an electronic device according to an embodiment. According to various embodiments, some of operations of FIG. 4 through FIG. 6 may be omitted, and the order of some operations may be changed.

FIG. 4 is a flow diagram 400 illustrating an electronic device generating an encryption key, according to an embodiment.

Referring to FIG. 4, a first blockchain node 410 (e.g., the first blockchain node 310 o FIG. 3), a second blockchain node 420 (e.g., the second blockchain node 420 of FIG. 3) and a third blockchain node 430 (e.g., the third blockchain node 330 of FIG. 3) are shown. According to an embodiment, the first blockchain node 410 may indicate the leader node which generates a transaction and requests endorsement, and the second blockchain node 420 and the third blockchain node 430 may indicate the endorser nodes which participate in the transaction endorsement.

According to an embodiment, the first blockchain node 410 may obtain a transaction generation request 451 according to a request of the user and/or other application stored in the electronic device 100 which is the first blockchain node 410.

In an embodiment, the first blockchain node 410 may identify at least one blockchain node 452 related to the transaction based on the transaction generation request 451. For example, the first blockchain node 410 may identify at least one blockchain node for endorsing the transaction.

According to an embodiment, the first blockchain node 410 may design to define nodes participating in the transaction with an input value before executing a first smart contract for the transaction, and identify at least one blockchain node for endorsing the transaction based on the design.

According to an embodiment, the first blockchain node 410 may identify at least one blockchain node for endorsing the transaction in runtime for which the smart contract is executed logically.

According to an embodiment, the first blockchain node 410 may identify at least one blockchain node for endorsing the transaction based on node information of blockchain nodes included in a blockchain network (e.g., the blockchain network 300 of FIG. 3) stored in a memory (e.g., the memory 110 of FIG. 1) or node information obtained from a separate blockchain node which manages the node information.

According to an embodiment, the first blockchain node 410 may generate an encryption key 453 corresponding to the transaction. For example, the first blockchain node 410 may generate a unique encryption key for the transaction requested to generate. The generated encryption key may indicate a temporary encryption key (e.g., temporary transaction encryption key (TTEK)) for the transaction.

According to an embodiment, the first blockchain node 410 may request a data server (e.g., the data server 350 of FIG. 3) included in the blockchain network to generate a shared ledger (e.g., the shared ledger 451 of FIG. 3) of the transaction in response to the transaction generation request 451. According to an embodiment, the shared ledger generated through the first blockchain node 410 may be deleted as the endorsement of the corresponding transaction is finished.

According to an embodiment, the first blockchain node 410 may share the encryption key generated for the transaction with the blockchain node participating in the transaction endorsement. For example, the first blockchain node 410 may transmit the encryption key 454 to the second blockchain node 420, and transmit the encryption key 455 to the third blockchain node 430.

FIG. 5 is a flow diagram illustrating an electronic device executing a smart contract, according to an embodiment.

Referring to FIG. 5, a first blockchain node 410, a second blockchain node 420, a third blockchain node 430 and a data server 510 (e.g., the data server 350 of FIG. 3) are shown.

According to an embodiment, the first blockchain node 410 may determine first data 551 stored in a memory (e.g., the memory 110) among input data (e.g., the read-set explained in FIG. 2) required to execute a first smart contract of a transaction requested to generate. For example, the first blockchain node 410 may determine data stored in a state database (e.g., the state database 222 of FIG. 2) among the input data.

According to an embodiment, the input data may include data not stored in the memory of the first blockchain node 410 among the input data required to execute the smart contract. Hereafter, the data stored in the first blockchain node among the input data may be expressed as first data. In addition, the data not stored in the first blockchain node among the input data may be expressed as second data.

According to an embodiment, the first blockchain node 410 may encrypt the first data 552 with an encryption key of the transaction. For example, the first blockchain node 410 may encrypt the first data with the encryption key based on the symmetric encryption algorithm (e.g., the AES).

According to an embodiment, the first blockchain node 410 may upload the encrypted first data 553 to the data sever 510. For example, the first blockchain node 410 may upload the encrypted first data to a shared ledger of the transaction generated at the data server 510. According to an embodiment, the data server 510 may store the encrypted first data in the shared ledger, based on the upload 553.

According to an embodiment, the data server 510 may notify the upload to other blockchain nodes included in the blockchain network according to the data upload in the shared ledger. For example, based on the first data upload, the data server 510 may transmit a first data upload notification 554 to the second blockchain node 420, and transmit a first data upload notification 555 to the third blockchain node 430.

According to an embodiment, the second blockchain node 420 and the third blockchain node 430 may receive a transaction endorsement request from the first blockchain node 410. In an embodiment, the second blockchain node 420 may upload the second data stored in the second blockchain node 420 to the data server 510 among the input data required to execute the smart contract of the transaction requested to generate based on the transaction endorsement request. For example, the second blockchain node 420 may encrypt the second data based on the encryption key obtained from the first blockchain node 410, and upload the encrypted second data 556 to the data server 510. According to an embodiment, based on the upload 556, the data server 510 may store the second data in the shard ledger. It has been described that the second blockchain node 420 uploads the second data not stored in the first blockchain node 410 to ease the description, but the second data may be uploaded through various blockchain nodes included in the blockchain network according to various embodiments.

According to an embodiment, the second blockchain node 420 may encrypt the second data based on various encryption algorithms. For example, if obtaining the encryption key from the first blockchain node 410, the second blockchain node 420 may encrypt the second data with the obtained encryption key. Alternatively, if the second blockchain node 420 obtains encryption key information from the first blockchain node 410, the second blockchain node 420 may generate an encryption key based on the encryption key information, and encrypt the second data with the generated encryption key. For example, if the second blockchain node 420 obtains a seed value used to generate the encryption key from the first blockchain node 410, the second blockchain node 420 may generate an encryption key using the obtained seed value, and encrypt the second data with the generated encryption key. In an embodiment, the encryption key generated by the second blockchain node 420 using the encryption key information may indicate the same encryption key as the encryption key owned by the first blockchain node 410.

According to an embodiment, the data server 510 may notify the upload to other blockchain nodes included in the blockchain network according to the data upload in the shared ledger. For example, based on the second data upload, the data server 510 may transmit a second data upload notification 557 to the first blockchain node 420.

According to an embodiment, in response to the notification 557, the first blockchain node 410 may request the second data 558 from the data server 510. For example, in response to the second data upload to the data server 510, the first blockchain node 410 may request the second data from the data server 510, among the first data and the second data required to execute the first smart contract.

According to an embodiment, the first blockchain node 410 may obtain from the data server 510 a notification indicating that at least part of the second data is uploaded, and download at least part of the second data uploaded to the data server 510 in response to the notification.

According to an embodiment, the first blockchain node 410 may identify the second data not stored in the partial ledger among the input data required to execute the first smart contract of the transaction, and request the second data from the data server 510. In an embodiment, the first blockchain node 410 may request the second data from the data server 510 before receiving the second data upload notification from the data server 510. In this case, the first blockchain node 410 may hold the second data upload.

According to an embodiment, the data server 510 may transmit the encrypted second data 559 in response to the request 558.

According to an embodiment, the first blockchain node 410 may decrypt the encrypted second data 560 with the encryption key. For example, the first blockchain node 410 may acquire the second data by decrypting the encrypted second data based on the encryption key information.

According to an embodiment, the data uploaded to the data server 510 may be encrypted with the encryption key of the transaction and decrypted, and thus the blockchain nodes may exchange state data required to execute the smart contract of the transaction without security problems.

According to an embodiment, the first blockchain node 410 may execute a first smart contract 561 based on the first data and the second data. For example, the first blockchain node 410 may execute the first smart contract using the first data stored in the memory and the second data obtained from the data server as the input data. The first blockchain node 410 may obtain first output data by executing the first smart contract. For example, the first blockchain node 410 may acquire the first output data including the input data, data (e.g., write-set) to be updated to the state database based on the first smart contract execution, and/or data (e.g., delete-set) to be deleted from the state database based on the first smart contract execution.

Generating the encryption key and encrypting and/or decrypting the first data or the second data using the encryption key explained in FIG. 4 and FIG. 5 may indicate similar operations to generating the encryption key and encrypting and/or decrypting the first data using the encryption key explained in FIG. 1 and FIG. 2.

FIG. 6 is a flow diagram illustrating an electronic device endorsing a transaction of a blockchain network, according to an embodiment.

Referring to FIG. 6, a first blockchain node 410, a second blockchain node 420, a third blockchain node 430, a data server 510 and a fourth blockchain node 610 (e.g., the fourth blockchain node 340 of FIG. 3) are shown.

According to an embodiment, the first blockchain node 410 may indicate the leader node which generates a transaction and requests endorsement, and the second blockchain node 420 and the third blockchain node 430 may indicate the endorser nodes which participate in the transaction endorsement. In addition, the fourth blockchain node 610 may indicate the ordering node.

According to an embodiment, the first blockchain node 410 may identify at least one blockchain node related to the transaction in response to the transaction generation request, and transmit a transaction endorsement request to the identified blockchain node. For example, the first blockchain node 410 may transmit a transaction endorsement request 651 to the second blockchain node 420. In addition, the first blockchain node 410 may transmit a transaction endorsement request 652 to the third blockchain node 430.

According to an embodiment, the second blockchain node 420 obtaining the endorsement request 651 may execute a second smart contract 653 for the transaction requested to endorse. In an embodiment, the second blockchain node 420 may perform a similar operation to the smart contract execution of the first blockchain node 410 explained in FIG. 5. For example, the second blockchain node 420 may encrypt data stored in the memory of the second blockchain node 420 with an encryption key among data required to execute the second smart contract and upload it to the data server 510. Also, for example, second blockchain node 420 may download from the data server 510 data not stored in the memory of the second blockchain node 420 among the data required to execute the second smart contract, and decrypt and use it with the encryption key. According to an embodiment, the second blockchain node 420 may generate second output data according to executing the second smart contract.

According to an embodiment, the second blockchain node 420 may transmit endorsement data 654 including the second output data to the first blockchain node 410. For example, the endorsement data may include the second output data and/or the input data for the second smart contract.

According to an embodiment, the second blockchain node 420 may delete the encryption key 655 after the transmission operation 654. For example, the second blockchain node 420 may shred the encryption key after transmitting the endorsement data for the transaction endorsement operation.

According to an embodiment, the third blockchain node 430 obtaining the endorsement request 652 may execute a third smart contract 656 of the transaction requested for the endorsement. In an embodiment, the third blockchain node 430 may execute the third smart contract in the similar manner to the second blockchain node 420. Hence, the third blockchain node 430 may generate third output data by executing the third smart contract.

According to an embodiment, the third blockchain node 430 may transmit endorsement data 657 including the third output data to the first blockchain node 410. For example, the endorsement data may include the third output data and/or the input data for the third smart contract.

According to various embodiments, the endorsement data transmitted to the first blockchain node 410 in response to the endorsement request of the first blockchain node 410 may include various data. For example, according to an endorsement policy, the second blockchain node 420 may transmit the endorsement data including some of the second output data to the first blockchain node 410. In addition, according to the endorsement policy, the third blockchain node 430 may transmit the endorsement data including some of the third output data to the first blockchain node 410. The endorsement policy may indicate a transaction endorsement method predetermined among various transaction endorsement methods.

According to an embodiment, the third blockchain node 430 may delete the encryption key 658 after the transmission operation 657. For example, the third blockchain node 430 may shred the encryption key after transmitting the endorsement data for the transaction endorsement operation.

According to an embodiment, the first through third blockchain nodes 410, 420 and 430 participating in the transaction endorsement operation each may execute a smart contract of the transaction. In an embodiment, the first through third blockchain nodes 410, 420 and 430 each may execute the smart contract using the state data stored in the shared ledger of the data server 510. In so doing, the first through third blockchain nodes 410, 420 and 430 may upload to the data server 510 or download from the data server 510 the encrypted state data using the pre-shared encryption key, thus maintaining security of the state data.

In addition, at least one blockchain node including the partial ledger included in the blockchain network may obtain from the data server 510 data not stored in the partial ledge among the data required to execute the smart contract, thus reducing unnecessary communications.

According to an embodiment, the first blockchain node 410 may endorse the transaction 659 based on the first output data and the endorsement data. For example, the first blockchain node 410 may compare at least part of the first output data with at least part of the second output data included in the endorsement data obtained from the second blockchain node 420. The compared data may be determined according to the endorsement policy. As a result of the comparison, if the first output data and the second output data match, transaction endorsement success may be determined. Also, for example, the first blockchain node 410 may compare at least part of the first output data with at least part of the third output data included in the endorsement data obtained from the third blockchain node 430. As a result of the comparison, if the first output data and the third output data match, transaction endorsement success may be determined.

As another example, as a result of the comparison, if the first output data and the second output data do not match, the first blockchain node 410 may determine transaction endorsement failure. Also, as another example, if the first output data and the third output data do not match, the first blockchain node 410 may determine transaction endorsement failure.

According to an embodiment, the first blockchain node 410 may determine transaction endorsement complete if every endorsement obtained from other blockchain nodes included in the blockchain network is successful.

According to an embodiment, the first blockchain node 410 may finish the transaction endorsement by performing operation 651 through operation 659 with the blockchain nodes related to the transaction.

According to various embodiments, the transaction endorsement operation may be carried out through various methods. According to another example, the second blockchain node 420 may obtain an endorsement request 651 from the first blockchain node 410. In so doing, the endorsement request 651 may include the first output data. The second blockchain node 420 may execute a second smart contract 653 of the transaction, in response to the endorsement request 651. In addition, the second blockchain node 420 may compare at least part of the first output data obtained from the first blockchain node 410 with at least part of the second output data. As a result of the comparison, the second blockchain node 420 may determine endorsement success if the first output data and the second output data are the same, and may determine endorsement failure if they are different. In an embodiment, the second blockchain node 420 may transmit endorsement data 654 including the determination result to the first blockchain node 410.

Also, the third blockchain node 430 may obtain an endorsement request 652 from the first blockchain node 410. In so doing, the endorsement request 652 may include the first output data. The third blockchain node 430 may execute a third smart contract 656 of the transaction, in response to the endorsement request 652. In addition, the third blockchain node 430 may compare at least part of the first output data obtained from the first blockchain node 410 with at least part of the third output data. As a result of the comparison, the third blockchain node 430 may determine endorsement success if the first output data and the third output data are the same, and may determine endorsement failure if they are different. In an embodiment, the third blockchain node 430 may transmit endorsement data 657 including the determination result to the first blockchain node 410.

In an embodiment, if omitting operation 659 and determining the endorsement success based on the endorsement data received from the second blockchain node 420 and the endorsement data received from the third blockchain node 430, the first blockchain node 410 may request the fourth blockchain node 610 to generate a block 660 including transaction data.

According to an embodiment, the first blockchain node 410 may display information of the endorsement operation result on a display (e.g., the display 140 of FIG. 1) included in the first blockchain node 410. For example, if the endorsement operation fails, the first blockchain node 410 may abort the transaction and provide a failure notification. As another example, if the endorsement operation is successful, the first blockchain node 410 may provide a transaction success notification.

According to an embodiment, the first blockchain node 410 may request the fourth blockchain node 610 to generate a block 660 including transaction data. For example, the first blockchain node 410 may request to generate the transaction block as the transaction consensus is finished. The first blockchain node 410 may transmit the transaction data including various data (e.g., the input data, the first output data) required to generate the transaction block to the fourth blockchain node 610.

According to an embodiment, the first blockchain node 410 may request the data server 510 to delete the shared ledger 661 as the transaction endorsement is finished. For example, the first blockchain node 410 may request to delete the shared ledger generated in the data base of the data server 510 as the transaction endorsement is finished. The data server 610 may delete the shared ledger 662 in response to the request 661. Hence, the shared ledger of the transaction may be temporarily generated and deleted based on the transaction generation in the blockchain network.

According to an embodiment, the fourth blockchain node 610 may store the transaction data in a block confirmation queue in response to the request 660. According to an embodiment, the fourth blockchain node 610 is not limited to the queue and may store the transaction data using one of various data structures. According to an embodiment, the fourth blockchain node 610 may generate a block 663 in order of storing in the block confirmation queue in a first in first out manner. The block generation operation may be expressed as ordering. According to an embodiment, the fourth blockchain node 610 may verify the block requested to generate based on the storage order of the block confirmation queue. For example, the fourth blockchain node 610 may generate a block based on the transaction data in the block confirmation queue storage order, and perform the block consensus operation. According to an embodiment, the block consensus operation may be performed based on various consensus algorithms. For example, the block consensus operation may be performed with the ordering nodes included in the blockchain network based on the POW, the POS, the PBFT, and the RAFT.

According to an embodiment, as the block is generated, the fourth blockchain node 610 may confirm the generated block as the verified block, and connect as a terminal node to the blockchain of the full ledger included in the blockchain network. Also, the fourth blockchain node 610 may request to update the partial ledger based on the confirmed block. According to an embodiment, the fourth blockchain node 610 may request the blockchain nodes participating in the transaction consensus of the block to update the block. For example, the fourth blockchain node 610 may request the third blockchain node 430 to update the partial ledger 664. Likewise, the fourth blockchain node 610 may request the second blockchain node 420 to update the partial ledger 665, and request the first blockchain node 420 to update the partial ledger 666.

According to an embodiment, the first through third blockchain nodes 410, 420 and 430 may update their partial ledger based on the partial ledger update requests 664, 665 and 666. For example, the first blockchain node 410 may update the partial ledger 667. For example, the first blockchain node 410 may store first output data generated based on the transaction in a state database (e.g., the state database 222 of FIG. 2), and connect the generated block as a terminal block of the blockchain (e.g., the blockchain 221 of FIG. 2). According to an embodiment, the first blockchain node 410 may shred the encryption key based on finishing the transaction generation.

Figure 7:
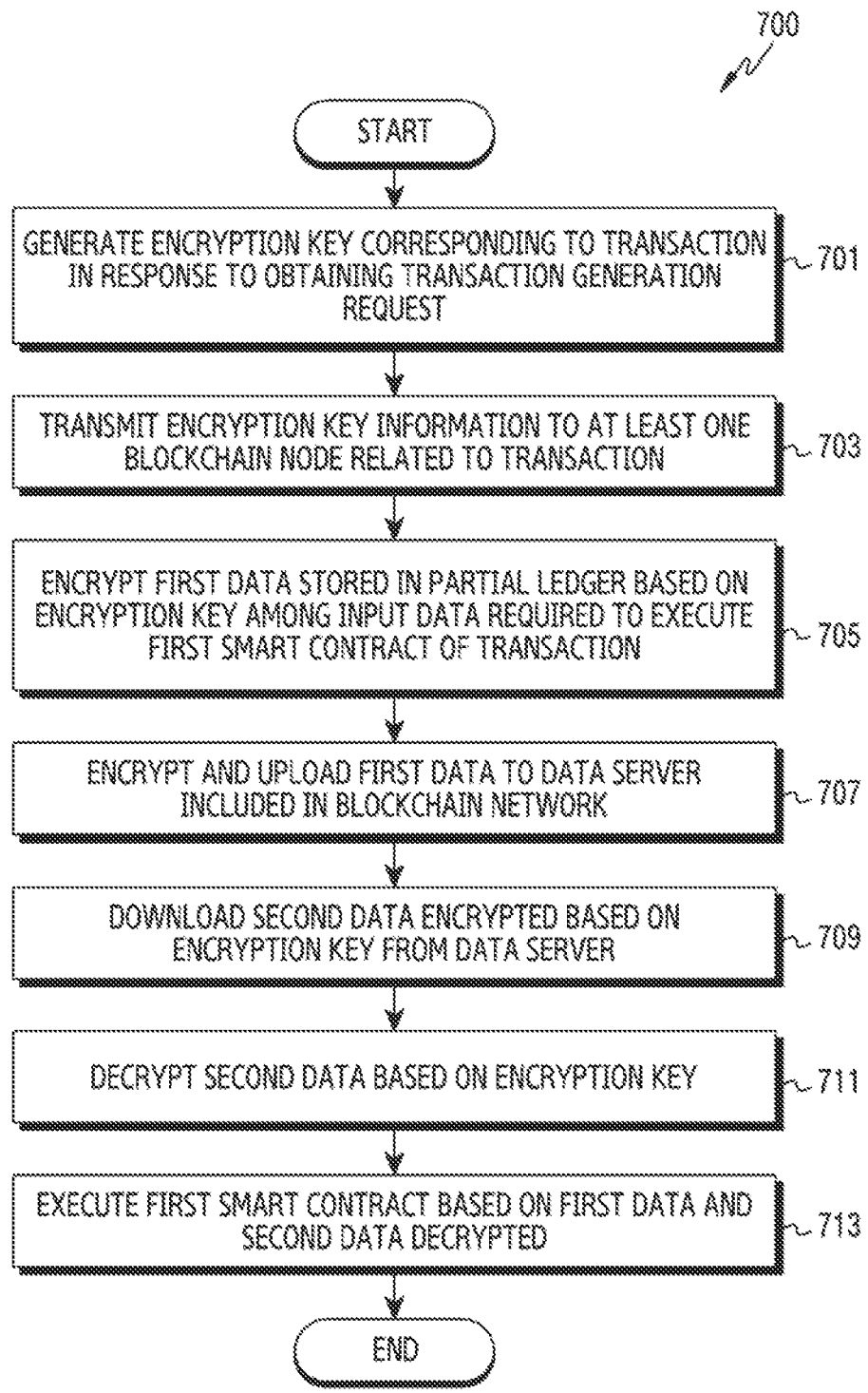
FIG. 7 is a flowchart illustrating a method of executing a smart contract, according to an embodiment.

FIG. 7 is a flowchart illustrating a method 700 of executing a smart contract, according to an embodiment.

Hereafter, redundant descriptions on similar operations to the operations explained in FIG. 3 through FIG. 6 shall be omitted.

Referring to FIG. 7, the electronic device 100 (e.g., the first blockchain node 410) may generate an encryption key corresponding to a transaction in response to obtaining a transaction generation request in operation 701. According to an embodiment, the processor 130 (e.g., the blockchain processor 230) of the electronic device 100 may obtain the transaction generation request from the user of the electronic device 100 and/or other application stored in the memory 110, and accordingly generate the encryption key corresponding to the transaction. In an embodiment, the encryption key may indicate a unique encryption key of the transaction. Hence, if a plurality of transactions is generated, their corresponding encryption keys may be different from each other.

According to an embodiment, the electronic device 100 may transmit encryption key information to at least one blockchain node related to the transaction in operation 703. For example, the electronic device 100 may transmit the encryption key information to at least one blockchain node (e.g., the second blockchain node 420 and/or the third blockchain node 430) related to the transaction requested to generate among blockchain nodes included in a blockchain network (e.g., the blockchain network 300 of FIG. 3). In an embodiment, the encryption key information may include a seed value (root-seed) for deriving the encryption key or at least part of the encryption key.

According to an embodiment, the electronic device 100 may encrypt first data stored in the partial ledger 220 based on the encryption key among input data (e.g., read-set) required to execute a first smart contract of the transaction in operation 705. For example, the electronic device 100 may identify the first data stored in the state database 222 among the input data, and encrypt the first data with the encryption key based on the asymmetric encryption algorithm.

According to an embodiment, the electronic device 100 may encrypt and upload the first data to a data server (e.g., the data server 350 of FIG. 3) included in the blockchain network in operation 707. According to an embodiment, the electronic device 100 may upload the first data to the shared ledger of the transaction stored in the data server.

According to an embodiment, the electronic device 100 may download second data encrypted based on the encryption key from the data server in operation 709. According to an embodiment, the electronic device 100 may obtain from the data server the second data not stored in the partial ledger 220 among the input data (e.g., read-set) required to execute the first smart contract of the transaction. According to an embodiment, the second data encrypted with the encryption key may include data uploaded through at least one other blockchain nodes included in the blockchain network.

According to an embodiment, the electronic device 100 may decrypt the second data based on the encryption key in operation 711. For example, the electronic device 100 may decrypt the second data encrypted with the encryption key of the transaction.

According to an embodiment, the electronic device 100 may execute the first smart contract based on the first data and the decrypted second data in operation 713. For example, the electronic device 100 may execute the first smart contract based on the first data which is data stored in the partial ledger 220 among the input data and the second data not stored in the partial ledger 220 and obtained from the data server. The electronic device 100 according to an embodiment, which stores the partial ledger 220 rather than the full ledger of the blockchain network, may not store part of state data required to execute a smart contract. Hence, the electronic device 100 may execute a smart contract using the input data uploaded to the data server.

According to an embodiment, the electronic device 100 may finish a transaction endorsement operation based on the first output data generated as executing the first smart contract and endorsement data obtained from the blockchain nodes related to the transaction.

Figure 8:
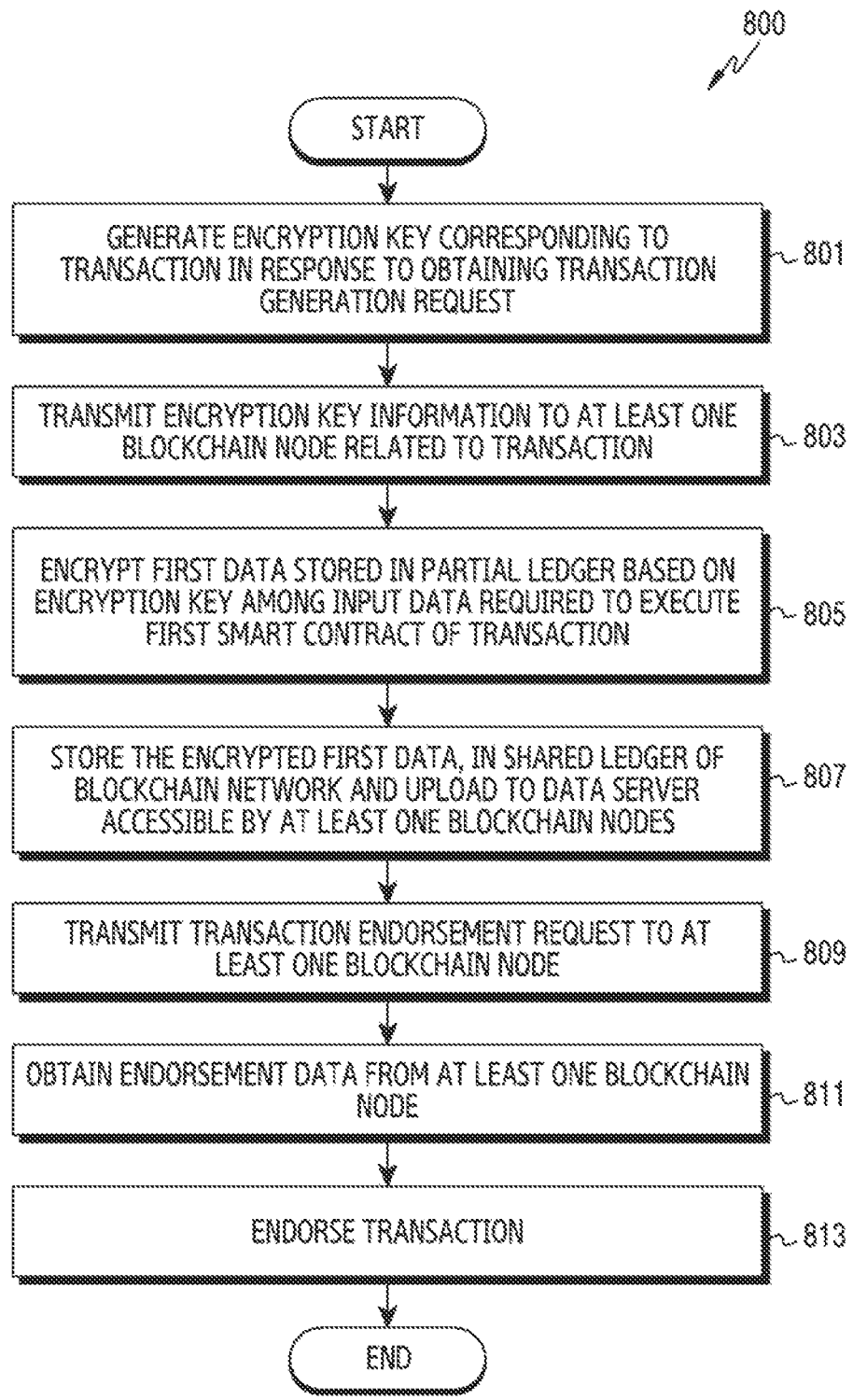
FIG. 8 is a flowchart illustrating a method of endorsing a transaction, according to an embodiment.

FIG. 8 is a flowchart illustrating a method 800 of endorsing a transaction, according to an embodiment.

Hereafter, redundant descriptions on similar operations to the operations explained in FIG. 3 through FIG. 7 shall be omitted.

Referring to FIG. 8, the electronic device 100 (e.g., the first blockchain node 410) may generate an encryption key corresponding to a transaction in response to obtaining a transaction generation request in operation 801.

According to an embodiment, the electronic device 100 may transmit encryption key information to at least one blockchain node related to the transaction in operation 803.

According to an embodiment, the electronic device 100 may encrypt first data stored in the partial ledger 220 based on the encryption key among input data required to execute a first smart contract of the transaction in operation 805.

According to an embodiment, the electronic device 100 may store the encrypted first data, in a shared ledger of a blockchain network (e.g., the blockchain network 300 of FIG. 3) and upload to a data server (e.g., the data server 510 of FIG. 6) accessible by at least one blockchain nodes in operation 807.

According to an embodiment, the electronic device 100 may transmit a transaction endorsement request to at least one blockchain node in operation 809. For example, the electronic device 100 may identify a blockchain node participating in consensus of the transaction requested to generate, and transmit the endorsement request to the at least one blockchain node identified (e.g., the second blockchain node 420 and/or the third blockchain node 430 of FIG. 6).

According to an embodiment, in operation 811, the electronic device 100 may obtain endorsement data from at least one blockchain node. For example, the electronic device 100 may obtain the endorsement data including at least part of output data which is an execution result of a smart contract executed at each of at least one blockchain node based on the endorsement request. According to an embodiment, to execute the smart contract, the at least one blockchain node may use data uploaded to the data server.

According to an embodiment, the electronic device 100 may endorse the transaction in operation 813. For example, the electronic device 100 may endorse the transaction based on the endorsement data and first output data generated according to executing a first smart contract. For example, the electronic device 100 may endorse the transaction, by performing a similar operation to operation 659 explained in FIG. 6.

According to an embodiment, the electronic device 100 may obtain second data not stored in the partial ledger 220 among the data required to execute the first smart contract from the data server, and execute the first smart contract based on the first data and the second data. For example, the electronic device 100 may download the second data encrypted based on the encryption key from the data server, and decrypt the second data based on the encryption key. In addition, the electronic device 100 may execute the first smart contract based on the first data and the decrypted second data. The electronic device 100 may endorse the transaction based on first output data generated according to executing the first smart contract.

According to an embodiment, as the endorsement is finished, the electronic device 100 may request a block generation node (e.g., the fourth blockchain node 610) to generate a block including transaction data, and receive an update request including the generated block in response to a block generation request.

According to an embodiment, the electronic device 100 may update the partial ledger 220 based on the generated block and the transaction data in response to the update request including the block.

As stated above, according to an embodiment, an electronic device (e.g., the electronic device 100 of FIG. 1) constituting a first blockchain node included in a blockchain network may include a communication circuit (e.g., the communication circuit 120 of FIG. 1) for communicating with the blockchain network, a memory (e.g., the memory 110 of FIG. 1) for storing a partial ledger (e.g., the partial ledger 220 of FIG. 2) including a part of a full ledger of the blockchain network and at least one processor (e.g., the processor 130 of FIG. 1) electrically connected with the communication circuit and the memory, and the at least one processor may generate an encryption key corresponding to a transaction in response to obtaining a transaction generation request, transmit information of the encryption key to at least one blockchain node related to the transaction, encrypt first data stored in the partial ledger among input data required to execute a first smart contract of the transaction based on the encryption key, upload the first data to a data server included in the blockchain network, download second data encrypted based on the encryption key from the data server, the second data being data not stored in the partial ledger among the input data, decrypt the second data based on the encryption key, and execute the first smart contract based on the first data and the decrypted second data.

According to an embodiment, the at least one processor may generate first output data by executing the first smart contract, transmit an endorsement request including the transaction to a second blockchain node related to the transaction, obtain endorsement data including second output data generated from the second blockchain node based on the endorsement request from the second blockchain node, and endorse the transaction based on the first output data and the second output data.

According to an embodiment, the second output data may be generated at the second blockchain node by executing a second smart contract of the transaction stored in the second blockchain node.

According to an embodiment, the encrypted second data may include data stored in the second blockchain node among the input data and encrypted by the second blockchain node based on information of the encryption key.

According to an embodiment, the at least one processor may generate transaction data based on the input data and the first output data as the endorsement of the transaction is finished, request a third blockchain node included in the blockchain network to generate a block including the transaction data, receive an update request including the generated block based on the request from the third blockchain node, and store the partial ledger based on the block and the first output data in response to the update request.

According to an embodiment, the at least one processor may request the data server to generate a partial ledger of the transaction in response to the transaction generation request, and request the data server to delete the shared ledger included in the data server as the endorsement of the transaction is finished, and the shared ledger may include a database which stores the first data and the second data encrypted based on the encryption key.

According to an embodiment, the at least one processor may shred the encryption key in response to finishing the transaction endorsement.

According to an embodiment, the partial ledger may include at least one block corresponding to at least one transaction of which consensus is participated by the electronic device and state data related to the at least one transaction.

According to an embodiment, the at least one processor may obtain from the data server a notification indicating that at least part of the second data is uploaded, and download at least part of the second data uploaded to the data server in response to the notification.

According to an embodiment, the at least one processor may identify the second data not stored in the partial ledger among the input data in response to generating the encryption key, and request the second data not stored in the partial ledger among the input data from the data server.

According to an embodiment, the at least one processor may identify the at least one blockchain node based on node information of blockchain nodes included in the blockchain network stored in the memory or node information obtained from a fourth blockchain node which manages the node information included in the blockchain network.

As set forth above, an operating method of an electronic device (e.g., the electronic device 100 of FIG. 1) constituting a first blockchain node included in a blockchain network may include generating an encryption key corresponding to a transaction in response to obtaining a transaction generation request, transmitting information of the encryption key to at least one blockchain node related to the transaction, encrypting first data which is data stored in a partial ledger including part of a full ledger of the blockchain network among input data required to execute a first smart contract of the transaction based on the encryption key, uploading the encrypted first data to a data server included in the blockchain network, downloading second data encrypted based on the encryption key from the data server, the second data being data not stored in the partial ledger among the input data, decrypting the second data based on the encryption key, and executing the first smart contract based on the first data and the decrypted second data.

According to an embodiment, the operating method of the electronic device may further include generating first output data by executing the first smart contract, transmitting an endorsement request including the transaction to a second blockchain node related to the transaction, obtaining endorsement data including second output data generated from the second blockchain node based on the endorsement request from the second blockchain node, and endorsing the transaction based on the first output data and the second output data.

According to an embodiment, the operating method may further include requesting the data server to generate a shared ledger of the transaction in response to the transaction generation request, and requesting the data server to delete the shared ledger included in the data server as the endorsement of the transaction is finished, and the shared ledger may store the first data and the second data encrypted based on the encryption key.

According to an embodiment, endorsing may include shredding the encryption key.

According to an embodiment, downloading the second data may include obtaining from the data server a notification indicating that at least part of the second data is uploaded and downloading at least part of the second data uploaded to the data server in response to the notification.

According to an embodiment, transmitting the information of the encryption key may include identifying the at least one blockchain node based on node information of blockchain nodes included in the blockchain network stored in the electronic device or node information obtained from a blockchain node which manages the node information included in the blockchain network, and transmitting the encryption key information to the at least one blockchain node identified, and the encryption key information may include at least one of a seed value for deriving the encryption key or the encryption key.

As set forth above, an electronic device (e.g., the electronic device 100 of FIG. 1) constituting a first blockchain node included in a blockchain network may include a communication circuit (e.g., the communication circuit 120 of FIG. 1) for communicating with the blockchain network, a memory (e.g., the memory 110 of FIG. 1) for storing a partial ledger (e.g., the partial ledger 220 of FIG. 2) including a part of a full ledger of the blockchain network and at least one processor (e.g., the processor 130 of FIG. 1) electrically connected with the communication circuit and the memory, and the at least one processor may generate an encryption key corresponding to a transaction in response to obtaining a transaction generation request and transmitting information of the encryption key to at least one blockchain node related to the transaction, encrypt first data which is data stored in the partial ledger among input data required to execute a smart contract of the transaction based on the encryption key, upload the encrypted first data to a data server of the blockchain network, the data server storing the shared ledger, transmit an endorsement request of the transaction to the at least one blockchain node, in response to the endorsement request, obtain at least one endorsement data including output data generated by executing a smart contract of the transaction stored in the at least one blockchain node based on at least a part of the shared ledger stored in the data server, and endorse the transaction based on the output data generated from the at least one blockchain node and output data generated by executing a first smart contract of the transaction stored in the memory.

According to an embodiment, the at least one processor may download second data encrypted based on the encryption key from the data server, the second data being data not stored in the partial ledger among the input data, decrypt the second data based on the encryption key, and execute the first smart contract based on the first data and the decrypted second data.

According to an embodiment, the at least one processor may generate transaction data based on the input data and the output data generated by executing the first smart contract as the endorsement of the transaction is finished, request a block generation node included in the blockchain network to generate a block including the transaction data, receive an update request including the block generated in response to the request from the block generation node, and in response to the update request, update the partial ledger based on the block and the transaction data.

Figure 9:
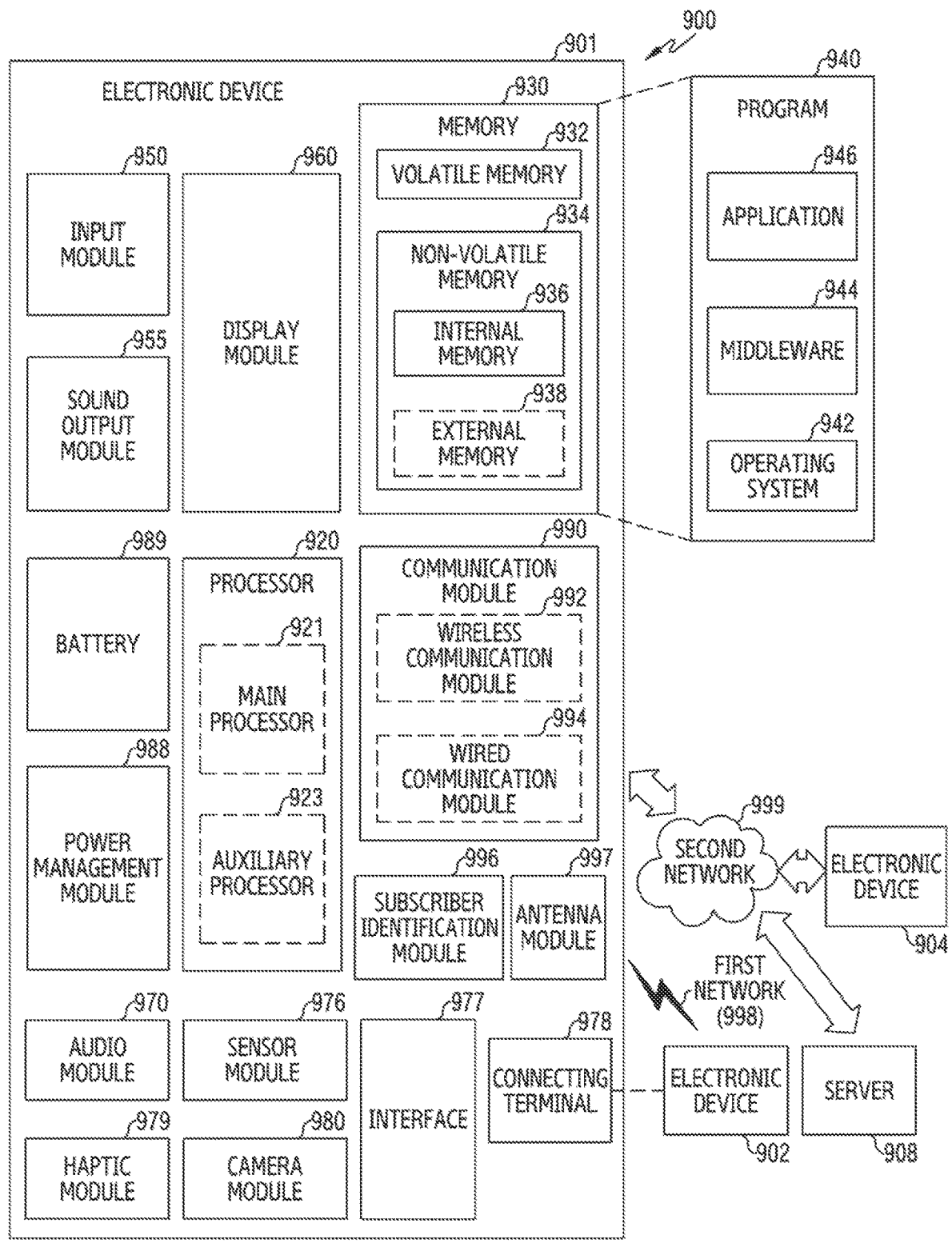
FIG. 9 is a block diagram illustrating an electronic device in a network environment, according to various embodiments.

FIG. 9 is a block diagram illustrating an electronic device 901 in a network environment 900, according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wired) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device constituting a first blockchain node included in a blockchain network, the electronic device comprising:
   a communication circuit configured to communicate with at least one other device in the blockchain network;
   at least one processor; and
   a memory storing a partial ledger including a part of a full ledger of the blockchain network, and instructions that, when executed by the at least one processor individually or collectively, cause the electronic device to:
   generate an encryption key corresponding to a transaction based on obtaining a transaction generation request,
   transmit information of the encryption key to at least one blockchain node related to the transaction,
   encrypt first data stored in the partial ledger among input data required to execute a first smart contract of the transaction based on the encryption key,
   upload the encrypted first data to a data server included in the blockchain network,
   download encrypted second data that is encrypted based on the encryption key, from the data server, wherein the second data is not stored in the partial ledger among the input data,
   decrypt the encrypted second data based on the encryption key, and
   execute the first smart contract based on the first data and the second data.

2. The electronic device of claim 1, wherein the instructions, when executed by the at least one processor individually or collectively, further cause the electronic device to:
   generate first output data by executing the first smart contract,
   transmit an endorsement request including the transaction to a second blockchain node related to the transaction,
   obtain endorsement data from the second blockchain node, the endorsement data including second output data generated by the second blockchain node based on the endorsement request, and
   endorse the transaction based on the first output data and the second output data.

3. The electronic device of claim 2, wherein the second output data includes data that the second blockchain node generates by executing a second smart contract of the transaction stored in the second blockchain node.

4. The electronic device of claim 2, wherein the second data includes data stored in the second blockchain node among the input data, and the second data is encrypted by the second blockchain node based on information of the encryption key.

5. The electronic device of claim 2, wherein the instructions, when executed by the at least one processor individually or collectively, further cause the electronic device to:
generate transaction data based on the input data and the first output data,
request a third blockchain node included in the blockchain network to generate a block including the transaction data,
receive an update request including the generated block, from the third blockchain node, and
store the partial ledger based on the block, and the first output data, based on the update request.

6. The electronic device of claim 2, wherein the instructions, when executed by the at least one processor individually or collectively, further cause the electronic device to:
request the data server to generate a partial ledger of the transaction based on the transaction generation request, and
request the data server to delete a shared ledger included in the data server based on completing the endorsement of the transaction, wherein the shared ledger includes the encrypted first data and the encrypted second data, that are encrypted based on the encryption key.

7. The electronic device of claim 2, wherein the instructions, when executed by the at least one processor individually or collectively, further cause the electronic device to:
shred the encryption key based on finishing the transaction endorsement.

8. The electronic device of claim 1,
wherein the partial ledger includes at least one block corresponding to at least one transaction and state data related to the at least one transaction, and
wherein the electronic device participates in a consensus operation for the at least one transaction.

9. The electronic device of claim 1, wherein the instructions, when executed by the at least one processor individually or collectively, further cause the electronic device to:
obtain a notification from the data server, the notification indicating that at least part of the second data is uploaded to the data server; and
download at least part of the second data from the data server, based on the notification.

10. The electronic device of claim 1, wherein the instructions, when executed by the at least one processor individually or collectively, further cause the electronic device to:
identify the second data not stored in the partial ledger among the input data based on generating the encryption key, and
request the second data not stored in the partial ledger among the input data from the data server.

11. The electronic device of claim 1, wherein the instructions, when executed by the at least one processor individually or collectively, further cause the electronic device to:
identify the at least one blockchain node based on node information of blockchain nodes included in the blockchain network stored in the memory, or node information obtained from a fourth blockchain node that manages the node information included in the blockchain network.

12. A method for operating an electronic device constituting a first blockchain node included in a blockchain network, the method comprising:
generating an encryption key corresponding to a transaction based on obtaining a transaction generation request;
transmitting information of the encryption key to at least one blockchain node related to the transaction;
encrypting first data based on the encryption key, wherein the first data is stored in a partial ledger including part of a full ledger of the blockchain network, among input data required to execute a first smart contract of the transaction;
uploading the encrypted first data to a data server included in the blockchain network;
downloading encrypted second data that is encrypted based on the encryption key, from the data server, wherein the second data is not stored in the partial ledger among the input data;
decrypting the encrypted second data based on the encryption key; and
executing the first smart contract based on the first data and the second data.

13. The method of claim 12, further comprising:
generating first output data by executing the first smart contract;
transmitting an endorsement request including the transaction to a second blockchain node related to the transaction;
obtaining endorsement data, from the second blockchain node, the endorsement data including second output data generated by the second blockchain node based on the endorsement request; and
endorsing the transaction based on the first output data and the second output data.

14. The method of claim 13, further comprising:
requesting the data server to generate a shared ledger of the transaction based on the transaction generation request; and
requesting the data server to delete the shared ledger based on completing the endorsement of the transaction,
wherein the shared ledger stores the encrypted first data and the encrypted second data, that are encrypted based on the encryption key.

15. The method of claim 13, wherein endorsing the transaction comprises: shredding the encryption key.

16. The method of claim 12, wherein downloading the second data comprises:
obtaining a notification, from the data server, the notification indicating that at least part of the second data is uploaded to the data server; and
downloading at least part of the second data based on the notification.

17. The method of claim 12, wherein transmitting the information of the encryption key comprises:
identifying the at least one blockchain node based on node information of blockchain nodes included in the blockchain network stored in the electronic device, or node information obtained from a blockchain node that manages the node information included in the blockchain network; and
transmitting the encryption key information to the identified at least one blockchain node, wherein the encryption key information includes at least one of a seed value for deriving the encryption key, or the encryption key.

18. An electronic device constituting a first blockchain node included in a blockchain network, comprising:
- a communication circuit configured to communicate with at least one other device in the blockchain network;
- at least one processor; and
- a memory storing a partial ledger including a part of a full ledger of the blockchain network, and instructions that, when executed by the at least one processor individually or collectively, cause the electronic device to:
- generate an encryption key corresponding to a transaction based on obtaining a transaction generation request,
- transmit information of the encryption key to at least one blockchain node related to the transaction,
- encrypt, based on the encryption key, first data stored in the partial ledger among input data required to execute a first smart contract of the transaction,
- upload the encrypted first data to a data server of the blockchain network, the data server including a shared ledger,
- transmit an endorsement request of the transaction to the at least one blockchain node,
- obtain at least one endorsement data, based on the endorsement request, wherein the at least one endorsement data includes data generated by executing a smart contract of the transaction stored in the at least one blockchain node, wherein the smart contract is executed based on at least part of the shared ledger, and
- endorse the transaction based on the at least one endorsement data and output data generated by executing the first smart contract of the transaction stored in the memory.

19. The electronic device of claim 18, wherein the instructions, when executed by the at least one processor individually or collectively, further cause the electronic device to:
- download encrypted second data that is encrypted based on the encryption key, from the data server, wherein the second data is not stored in the partial ledger among the input data;
- decrypt the encrypted second data based on the encryption key, and
- execute the first smart contract based on the first data and the second data.

20. The electronic device of claim 18, wherein the instructions, when executed by the at least one processor individually or collectively, further cause the electronic device to:
- generate transaction data based on the input data and the output data generated by executing the first smart contract,
- request a block generation node included in the blockchain network to generate a block including the transaction data,
- receive an update request including the generated block from the block generation node, and
- update the partial ledger based on the generated block and the transaction data.

* * * * *